United States Patent
Jung et al.

(10) Patent No.: US 11,153,763 B2
(45) Date of Patent: Oct. 19, 2021

(54) METHOD AND DEVICE FOR ANALYZING COMMUNICATION CHANNELS AND DESIGNING WIRELESS NETWORKS, IN CONSIDERATION OF INFORMATION RELATING TO REAL ENVIRONMENTS

(71) Applicant: Samsung Electronics Co., Ltd., Suwon-si (KR)

(72) Inventors: Sungkyu Jung, Seongnam-si (KR); Jinwook Kim, Yongin-si (KR); Hyesuk Kim, Suwon-si (KR); Donghyuck Park, Yongin-si (KR); Sungbum Park, Seoul (KR); Yoonsung Park, Suwon-si (KR); Jaesung An, Suwon-si (KR); Sungrok Yoon, Seoul (KR); Soonyoung Lee, Seoul (KR); Minsung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/349,475

(22) PCT Filed: Mar. 13, 2017

(86) PCT No.: PCT/KR2017/002692
§ 371 (c)(1),
(2) Date: May 13, 2019

(87) PCT Pub. No.: WO2018/092991
PCT Pub. Date: May 24, 2018

(65) Prior Publication Data
US 2019/0342763 A1    Nov. 7, 2019

Related U.S. Application Data

(60) Provisional application No. 62/423,412, filed on Nov. 17, 2016.

(30) Foreign Application Priority Data

Dec. 8, 2016 (KR) ......................... 10-2016-0167138
Feb. 10, 2017 (KR) ......................... 10-2017-0018610

(51) Int. Cl.
*H04B 17/27* (2015.01)
*H04W 16/18* (2009.01)
(Continued)

(52) U.S. Cl.
CPC ............. *H04W 16/18* (2013.01); *G06T 17/05* (2013.01); *H04B 17/27* (2015.01); *H04B 17/309* (2015.01);
(Continued)

(58) Field of Classification Search
None
See application file for complete search history.

(56) References Cited

U.S. PATENT DOCUMENTS 5,450,615 A    9/1995  Fortune et al.
5,949,988 A *  9/1999  Feisullin ............ H04B 17/0082
                                                    342/359
(Continued)

FOREIGN PATENT DOCUMENTS

CN    1498000 A    5/2004
CN    1806403 A    7/2006
(Continued)

OTHER PUBLICATIONS

U.S. Office Action dated Feb. 7, 2020, issued in U.S. Appl. No. 15/816,291.
(Continued)

*Primary Examiner* — Edan Orgad
*Assistant Examiner* — Emmanuel K Maglo
(74) *Attorney, Agent, or Firm* — Jefferson IP Law, LLP

(57) ABSTRACT

The present disclosure relates to a communication technique for fusing, with an IoT technology, a 5G communication
(Continued)

system for supporting a higher data transmission rate than a 4G system, and a system therefor. The present disclosure may be applied to intelligent services, such as smart homes, smart buildings, smart cities, smart cars or connected cars, health care, digital education, retail businesses, and security and safety related services, on the basis of 5G communication technologies and I-T-related technologies. A method for analyzing signal transmission properties in a wireless communication system, according to one embodiment of the present specification, comprises: obtaining first information comprising three-dimensional map information; obtaining second information comprising real environment information from image information relating to the three-dimensional map information; determining locations of a plurality of transmitter candidates on the basis of at least one of the first information and the second information; and performing a ray tracing simulation on the basis of the first information and the second information. The preset research was carried out with the support of the "Cross-ministry Giga Korea Project" of the Ministry of Science, ICT and Future Planning, of the Republic of Korea.

12 Claims, 23 Drawing Sheets

(51) Int. Cl.
  *H04B 17/309* (2015.01)
  *H04B 17/391* (2015.01)
  *G06T 17/05* (2011.01)
  *H04W 16/28* (2009.01)

(52) U.S. Cl.
  CPC ........ *H04B 17/3913* (2015.01); *H04W 16/28* (2013.01)

(56) References Cited

U.S. PATENT DOCUMENTS

| | | | |
|---|---|---|---|
| 6,308,043 B1 | 10/2001 | Solheim et al. | |
| 7,764,230 B2* | 7/2010 | Chizhik | G01C 21/206 342/453 |
| 7,995,117 B1 | 8/2011 | Bonn | |
| 10,433,185 B2* | 10/2019 | Barros | H04W 16/28 |
| 10,755,357 B1 | 8/2020 | Davis et al. | |
| 10,820,213 B2 | 10/2020 | Park et al. | |
| 2002/0093538 A1 | 7/2002 | Carlin | |
| 2004/0127224 A1* | 7/2004 | Furukawa | H04W 16/18 455/446 |
| 2004/0236547 A1 | 11/2004 | Rappaport et al. | |
| 2004/0259554 A1 | 12/2004 | Rappaport et al. | |
| 2005/0091958 A1 | 5/2005 | Zehavi et al. | |
| 2006/0019679 A1* | 1/2006 | Rappaport | G01S 5/0252 455/456.5 |
| 2006/0244830 A1 | 11/2006 | Davenport et al. | |
| 2007/0093212 A1 | 4/2007 | Sugahara | |
| 2008/0161005 A1 | 7/2008 | Sato et al. | |
| 2008/0229234 A1 | 9/2008 | Astolfi et al. | |
| 2008/0297505 A1 | 12/2008 | Elsberg et al. | |
| 2010/0197239 A1 | 8/2010 | Catovic et al. | |
| 2010/0250221 A1 | 9/2010 | Kim et al. | |
| 2011/0090123 A1* | 4/2011 | Sridhara | G01S 5/0252 342/450 |
| 2011/0093194 A1 | 4/2011 | Paik et al. | |
| 2011/0122997 A1* | 5/2011 | Lu | A61N 5/1031 378/65 |
| 2011/0153294 A1 | 6/2011 | Yoon et al. | |
| 2011/0222372 A1* | 9/2011 | O'Donovan | G01S 3/8083 367/103 |
| 2011/0263277 A1 | 10/2011 | Zuniga Gallegos | |
| 2011/0281526 A1 | 11/2011 | Matsuda et al. | |
| 2011/0287801 A1 | 11/2011 | Levin et al. | |
| 2012/0087270 A1 | 4/2012 | Wan et al. | |
| 2012/0113095 A1 | 5/2012 | Hwang et al. | |
| 2012/0293356 A1* | 11/2012 | Barthel | G01S 7/539 342/27 |
| 2012/0313946 A1 | 12/2012 | Nakamura et al. | |
| 2013/0278465 A1 | 10/2013 | Owen | |
| 2014/0004885 A1 | 1/2014 | Demaine | |
| 2014/0115338 A1* | 4/2014 | Faith | H04N 21/23412 713/176 |
| 2015/0293215 A1* | 10/2015 | Kim | G01S 15/8993 367/7 |
| 2015/0294511 A1* | 10/2015 | Nishioka | H04N 5/23212 345/420 |
| 2016/0007426 A1 | 1/2016 | Ashdown et al. | |
| 2016/0013822 A1 | 1/2016 | Polehn et al. | |
| 2016/0330643 A1* | 11/2016 | Sahin | H04B 7/088 |
| 2017/0100092 A1* | 4/2017 | Kruse | G01S 7/5202 |
| 2017/0201976 A1* | 7/2017 | Yue | H04W 4/025 |
| 2017/0277979 A1* | 9/2017 | Allen | G06K 9/6256 |
| 2017/0338901 A1 | 11/2017 | Zhihua et al. | |
| 2018/0075746 A1* | 3/2018 | Jiang | H04B 7/0617 |
| 2018/0138996 A1 | 5/2018 | Lee et al. | |
| 2019/0036598 A1 | 1/2019 | Smyth et al. | |

FOREIGN PATENT DOCUMENTS

| | | | |
|---|---|---|---|
| EP | 0 664 619 A1 | | 7/1995 |
| EP | 2 615 862 A1 | | 7/2013 |
| GB | 2530104 A | | 3/2016 |
| KR | 10-2007-0010318 A | | 1/2007 |
| KR | 10-2007-0034205 A | | 3/2007 |
| KR | 10-2008-0105369 A | | 12/2008 |
| KR | 10-0972034 B1 | | 7/2010 |
| KR | 10-2011-0019117 A | | 2/2011 |
| WO | 2016/067017 A1 | | 5/2016 |

OTHER PUBLICATIONS

Zhenliang Zhang et al.,"Coverage and channel characteristics of millimeter wave band using ray tracing", 2015 IEEE International Conference on Communications(ICC), pp. 1380-1385, Sep. 10, 2015, See sections II-III.

Vittorio Degli-Esposti et al.,"Ray-Tracing-Based mm-Wave Beamforming Assessment", IEEE Access (vol. 2),pp. 1314-1325, Oct. 31, 2014, See section II.

Zhengqing Yun et al., "Radio propagation modeling in complex environments for wireless communications", Microwaves, Communications, Antennas and Electronics Systems, 2009. COMCAS 2009. IEEE International Conference on, IEEE, Piscataway, NJ, USA, Nov. 9, 2009, pp. 1-4, XP031614693, ISBN: 978-1-4244-3985-0.

Extended European Search Report dated Nov. 7, 2019, issued in European Patent Application No. 17872534.7.

U.S. Non-final Office Action dated Jan. 6, 2020, issued in U.S. Appl. No. 15/816,340.

Tarng J H et al., "Effective Models in Evaluating Radio Coverage on Single Floors of Multifloor Buildings", IEEE Transactions on Vehicular Technology, IEEE Service Center, Piscataway, NJ, US, vol. 48, No. 3, XP011063874, May 1, 1999.

Yiming Ji et al., "ARIADNE : A Dynamic Indoor Signal Map Construction and Localization System", MOBISYS 2006. The 4th. International Conference on Mobile Systems, Applications and Services. Uppsala, Sweden, International Conference on Mobile Systems, Applications and Services, New York, NY : ACM, US, pp. 151-164, XP058108000, DOI: 10.1145/1134680.1134697 ISBN: 978-1-59593-195-5, Jun. 19-22, 2006.

Kareem El-Kafrawy et al., "Propagation Modeling for Accurate Indoor WLAN RSS-Based Localization", Vehicular Technology Conference Fall (VTC 2010—Fall), 2010 IEEE 72nd, IEEE, Piscataway, NJ, USA, pp. 1-5, XP031770063, ISBN: 978-1-4244-3573-9, Sep. 6, 2010.

European Search Report dated Jul. 25, 2019, issued in European Patent Application No. 17872533.9.

(56) References Cited

OTHER PUBLICATIONS

European Search Report dated Jul. 25, 2019, issued in European Patent Application No. 17872267.4.
Partial European Search Report dated Jul. 25, 2019, issued in European Patent Application No. 17872534.7.
Chinese Office Action dated May 7, 2021, issued in Chinese Application No. 201780070445.9.
USPTO Office Action dated Jul. 6, 2021, issued in related U.S. Appl. No. 17/079,899.

* cited by examiner

METHOD AND DEVICE FOR ANALYZING COMMUNICATION CHANNELS AND DESIGNING WIRELESS NETWORKS, IN CONSIDERATION OF INFORMATION RELATING TO REAL ENVIRONMENTS

TECHNICAL FIELD

Embodiments of the disclosure relate to a method for analyzing communication channels and designing a network based on the communication channel analysis and a device using the method in a communication system. In detail, the embodiments of the disclosure relate to a method for analysis of communication channels based on a ray tracing simulation considering real environments related to objects in a signal transmission/reception environment and for design of a network based on the communication channel analysis and a device using the method.

This research was conducted with support from the "governmental department Giga KOREA projects".

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, there is a need of a method for estimating a channel environment and designing a network based on the estimation result in a 5G communication system. Network design is performed to make it possible to provide network services via radio communications within a certain area in such a way of setting a location of a transmitter (Tx) and configuration values for transmitting a radio frequency (RF) signal, determining information on various RF signals at potential locations of a receiver (Rx), analyzing channel environments based on the result from a mathematical modeling technique or a ray tracing simulation, and determining the best Tx location based on the channel environment analysis result. For such a channel environment analysis, it is necessary to provide various types of information on the RF signal (e.g., pathloss and coverage) on the basis of which network design is performed. In an embodiment, examples of the mathematical modeling technique may include an empirical modeling technique.

FIG. 1 is a diagram for explaining network planning with a mathematical modeling technique.

In reference to FIG. 1, transmitters 110 and 120 form transmit beams 112 and 122, respectively, to transmit signals.

Such a mathematical modeling technique makes it possible to predict RF information through a function that is explicitly expressed through a specific signal transmission/reception modeling technique with inputs such as frequency and propagation distance of a transmit signal. As shown in the drawing, the transmitters 110 and 120 may each form three beams, as denoted by reference numbers 112 and 122, on the basis of which RF characteristics of the transmit signals may be applied through a modeling technique. The mathematical modeling technique makes it possible to predict the RF information with a relatively small computation amount, but it has a drawback of low modeling accuracy.

In this respect, application of a ray tracing-based simulation technique is being considered for analyzing channel characteristics related to a high frequency RF signal; the ray tracing-based simulation technique makes it possible to analyze communication channels in consideration of potential propagation paths of the RF signal. However, this technique is likely to increase the computation amount; thus, there is a need of a method for reflecting the real environment to the simulation so as to guarantee accuracy.

DISCLOSURE OF INVENTION

Technical Problem

Embodiments of the disclosure have been conceived to solve the above problems and aim to provide a method and device for performing a ray tracing simulation in a more realistic environment for analyzing communication channels and designing a network based on the analysis result, and a method and device for analyzing ray tracing simulation result values. The disclosure also aims to provide a method and device for reflecting a more accurate and more realistic environment in the ray trancing-based simulation for analyzing the RF transmission/reception environment so as to reduce the computation amount.

Solution to Problem

According to an embodiment of the disclosure, a method for analyzing signal transmission characteristics in a wireless communication system includes acquiring first information including 3-dimensional map information, acquiring second information including real environment information from image information related to the 3-dimensional map information, determining at least a plurality of candidate transmitter locations based on at least one of the first information or the second information, and performing a ray tracing simulation based on the first and second information.

According to another embodiment of the disclosure, a computing device for analyzing signal transmission characteristics in a wireless communication system includes a transceiver configured to transmit and receive information and a controller configured to control to acquire first information including 3-dimensional map information, acquire second information including real environment information from image information related to the 3-dimensional map information, determine at least a plurality of candidate transmitter locations based on at least one of the first information or the second information, and perform a ray tracing simulation based on the first and second information.

According to another embodiment of the disclosure, a method for designing a network of a wireless communication system includes acquiring real environment information based on 3-dimensional map information and image information related to the 3-dimensional map information, determining a plurality of candidate transmitter locations, and performing a ray tracing simulation based on the real environment information and the plurality of candidate transmitter locations.

According to another embodiment of the disclosure, a computing device for designing a network of a wireless communication system includes a transceiver configured to transmit and receive information and a controller configured to control to acquire real environment information based on 3-dimensional map information and image information related to the 3-dimensional map information, determine a plurality of candidate transmitter locations, and perform ray tracing simulation based on the plurality of candidate transmitter locations.

Advantageous Effects of Invention

The embodiments of the disclosure are advantageous in terms of improving accuracy of a ray tracing simulation in use for designing a network through RF transmission environment analysis and facilitating network design based thereon and, in particular, in terms of setting the Tx locations efficiently in a radio communication environment. The embodiments of the disclosure are also advantageous in terms of reducing a calculation amount required for performing a ray tracing simulation.

MODE FOR THE INVENTION

Figure 1:
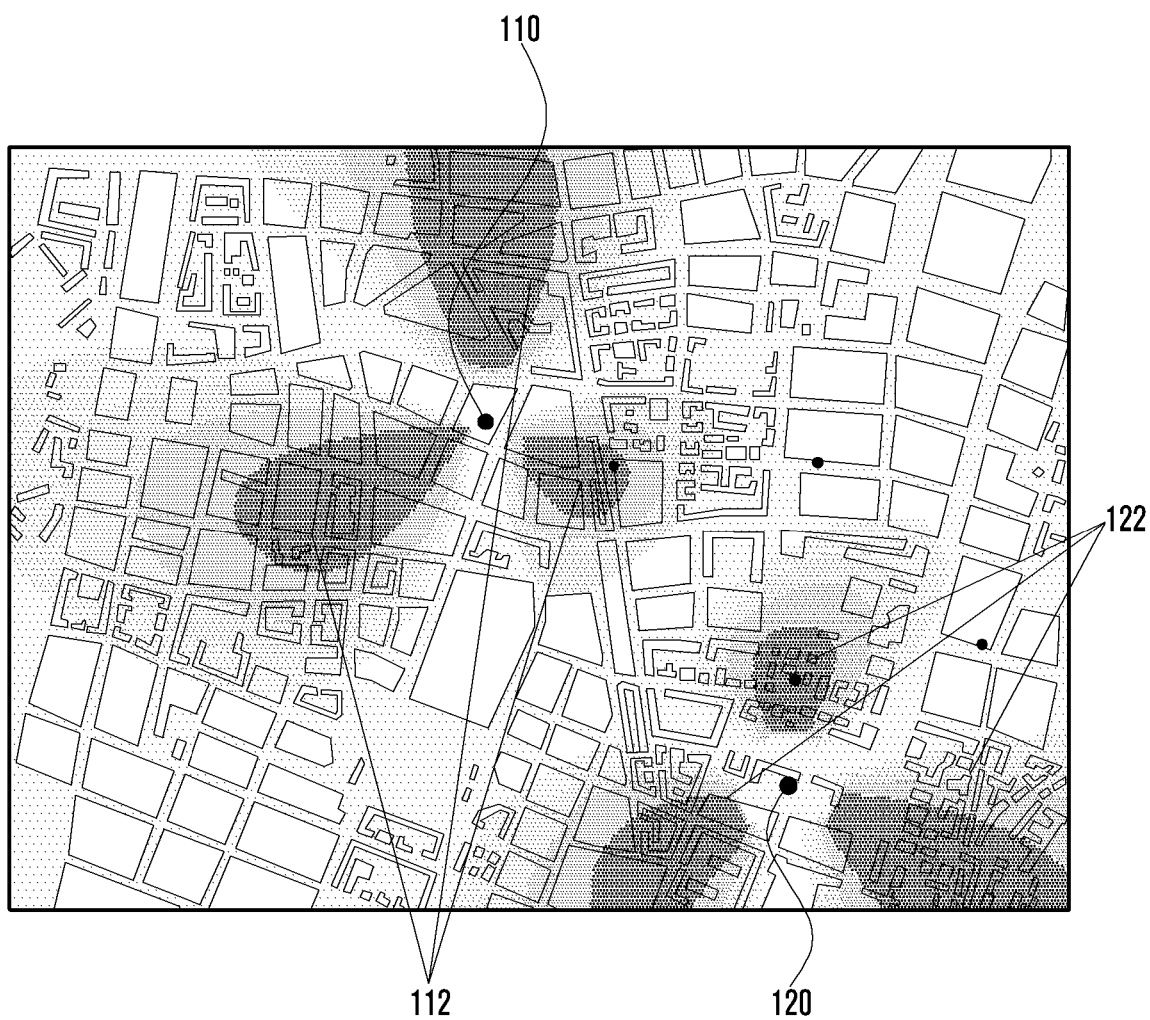
FIG. 1 is a diagram for explaining network design with a mathematical modeling technique.

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Although depicted in a particular order in a drawing, two successive steps may be performed in reverse order or in parallel. It is obvious that a step may be performed optionally unless expressly stated as essential.

Figure 2:
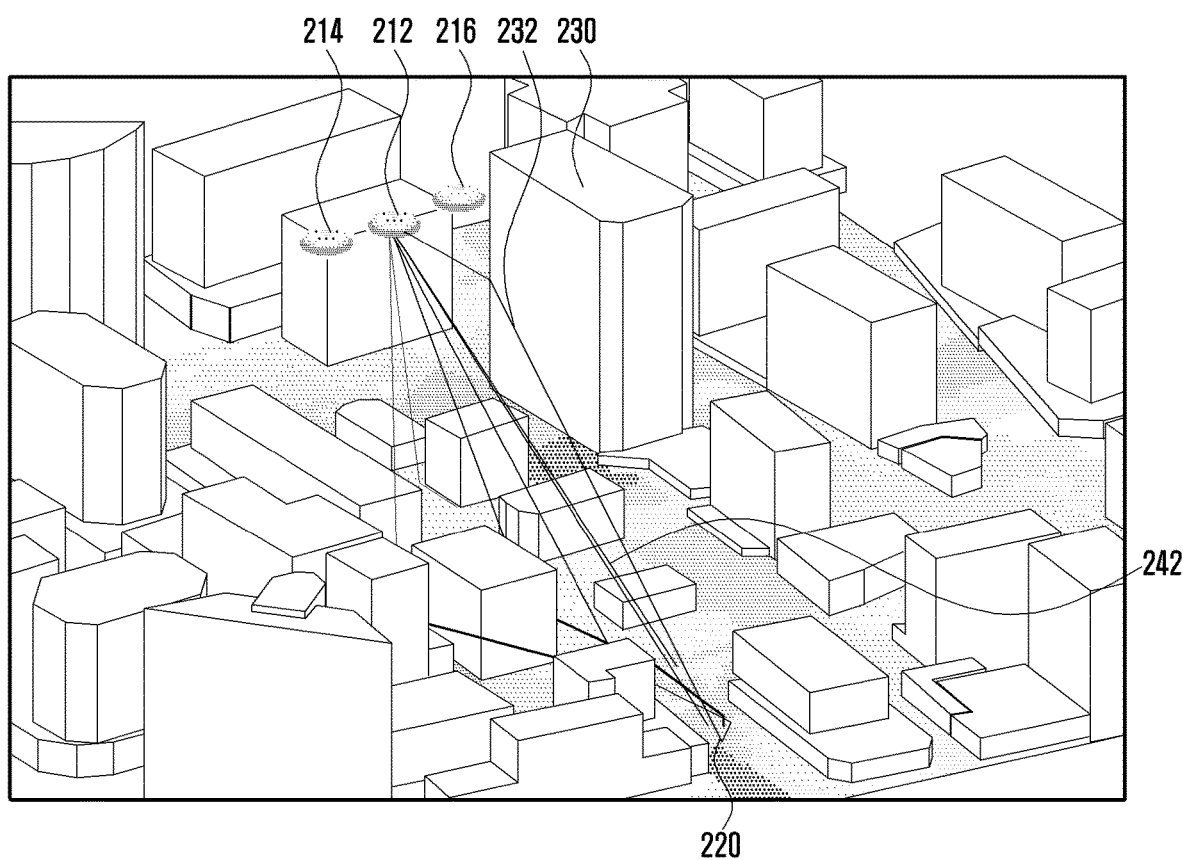
FIG. 2 is a diagram for explaining a ray tracing simulation method according to an embodiment of the disclosure.

FIG. 2 is a diagram for explaining a ray tracing simulation method according to an embodiment of the disclosure.

In reference to FIG. 2, assuming that one or more transmitters 212, 214, and 216 are transmitting signals, received strengths of the signals transmitted by the respective transmitters 212, 214, and 216 are represented with gradient shading on a map. The received strength of the signal increases as the shade darkens.

The received strength of a signal may be measured at an assumed location of the receiver 220 in a corresponding area. Potentials paths from the transmitter 212 to the receiver 220 may determine respective transmission channels. A signal may be transmitted from the transmitter 212 to the receiver 220 directly as denoted by reference number 242 and after being reflected by an object 230 as denoted by reference number 232. By performing a ray tracing-simulation in this manner, it may be possible to acquire information on the received strengths of signals from the transmitters 212, 214, and 216 and propagation paths of the corresponding signals at a certain area. By considering at least one of a surface material or appearance of the reflecting object in determining the received strength of the signal per propagation path, the receiver 220 may acquire more accurate received signal information. Although mentioned as a surface material in the embodiments, the corresponding term is intended to include not only the exterior surface but also an interior material of the object that may affect the reflection of a radio wave, and such information makes it possible to estimate the reflection characteristic of the radio wave more accurately. In the embodiments, the location of a receiver may be determined based on the information on locations of windows, which may be acquired through additional information input, or user's settings for the simulation for designing a network.

It may be possible that there is an obstacle through which a radio wave may pass on the direct propagation path of the signal. The obstacle may be a tree by way of example, and various obstacles including trees that allow a radio wave to pass through, attenuating the corresponding signal, may be considered in performing a ray tracing simulation. By considering the information on radio wave-penetrable obstacles, it is possible to improve the accuracy of the simulation result. Although a tree exemplifies an obstacle attenuating the signal carried by the radio wave penetrating therethrough, the obstacle may be another plant or a structure placed on the communication path or other objects that may attenuate the signal.

By performing a ray tracing in this way, it is possible to determine at least one of the best locations of the transmitter or the receiver. According to an embodiment, the ray tracing simulation may be performed in consideration of multiple candidate locations of the transmitter and the receiver, and one of the candidate locations may be determined as a result of the ray tracing simulation result. In an embodiment, designing a network may be characterized by determining the location of the transmitter through the ray tracing simulation. It may be possible to obtain a combination of the best base station locations in such a way of determining candidate transmitter locations outnumbering the number of transmitters to be actually installed, performing the ray tracing simulation based thereon, and post-processing based on ray information acquired from the signals transmitted from all of the candidate transmitter locations.

Such a ray tracing simulation technique may make it possible to determine the transmission channels corresponding to the respective paths of an RF signal and acquire RF signal information at the locations of the receiver 220 based on the determination result. In an embodiment, the ray tracing simulation technique may make it possible to acquire more accurate RF signal information by calculating at least one of a signal propagation distance, a signal path environment (e.g., kind of medium), a 3D geographical feature, or reflection and diffraction from a building. A ray tracing simulation-based channel estimation method may also reflect a real environment accurately without any limit caused by the frequency of the RF signal and determine at least one of the best transmit and receive locations based on the simulation result.

A 5G network uses ultra-high frequency signals in the range of 28-60 GHz. In this respect, it is preferable to employ a ray tracing simulation technique rather than a mathematical modeling technique in a 5G network design tool to improve accuracy of the radio signal information. In an example of a ray tracing simulation, in order to predict propagation paths of a radio wave that is reflected on buildings, the reflections are calculated under the assumption that the surfaces of the buildings have the same RF characteristics. However, such an assumption make it difficult to guarantee the accuracy of a simulation result because the reflectivity of RF signal varies according to surface material and appearance and pattern; therefore, there is a need of a ray tracing technique considering such information.

In order to perform such a ray tracing simulation, it is necessary to acquire building arrangement and geographical feature information and analyze a signal transmission/reception environment based on map data to which the acquired information is reflected. On the basis of the signal transmission/reception environment, it may be possible to analyze links between transmitters and receivers and total communication system throughput. If the system throughput obtained from the simulation result does not satisfy a predetermined reference level, it may be possible to repeat the ray tracing simulation by changing simulation settings in consideration of other transmitters. In order to analyze the communication environment of a communication system, particularly a 5G communication system, there is a need of an RF planning method and device that is capable of reflecting radio wave characteristics of the mmWave, which requires acquiring information on the real environment (trees, reflectors, etc.) affecting a radio environment and performing a simulation in consideration of the acquired information for effective ray tracing simulation. Such simulation-based RF planning may require a parallelization technique, a step-wise analysis technique, an object extraction-based arrangement technique, etc.

An embodiment is directed to an RF network planning method for analyzing propagation paths in an area to deploy base stations at the best locations for the purpose of providing communication services within the area and a device using the method.

Figure 3A:
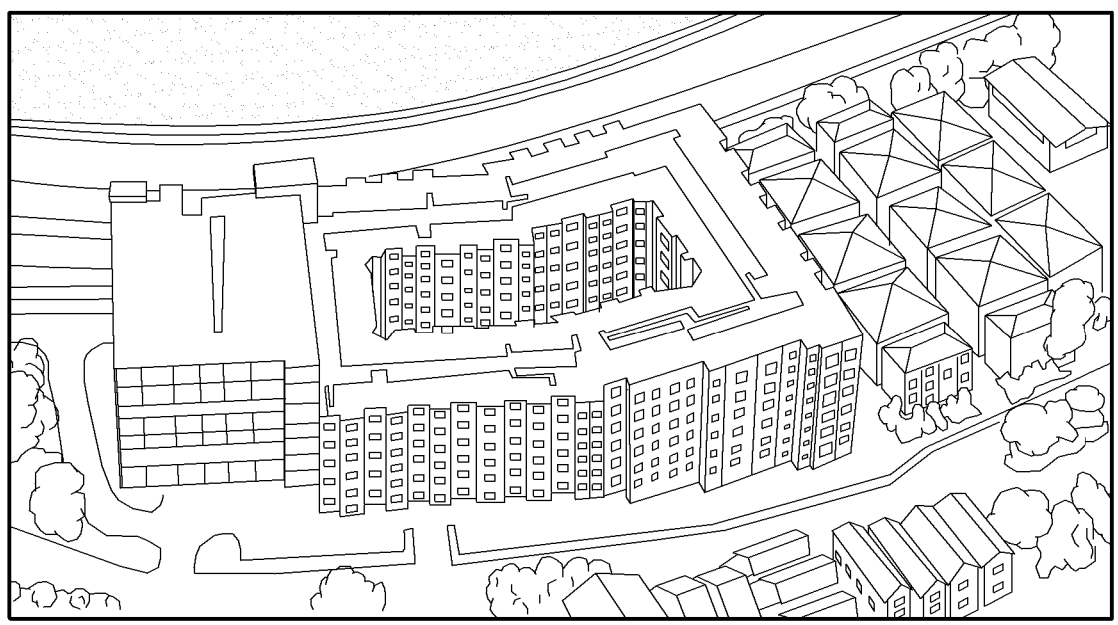
FIGS. 3A and 3B are diagrams for explaining a method for acquiring 3-dimensional map information according to an embodiment of the disclosure.
Figure 3B:
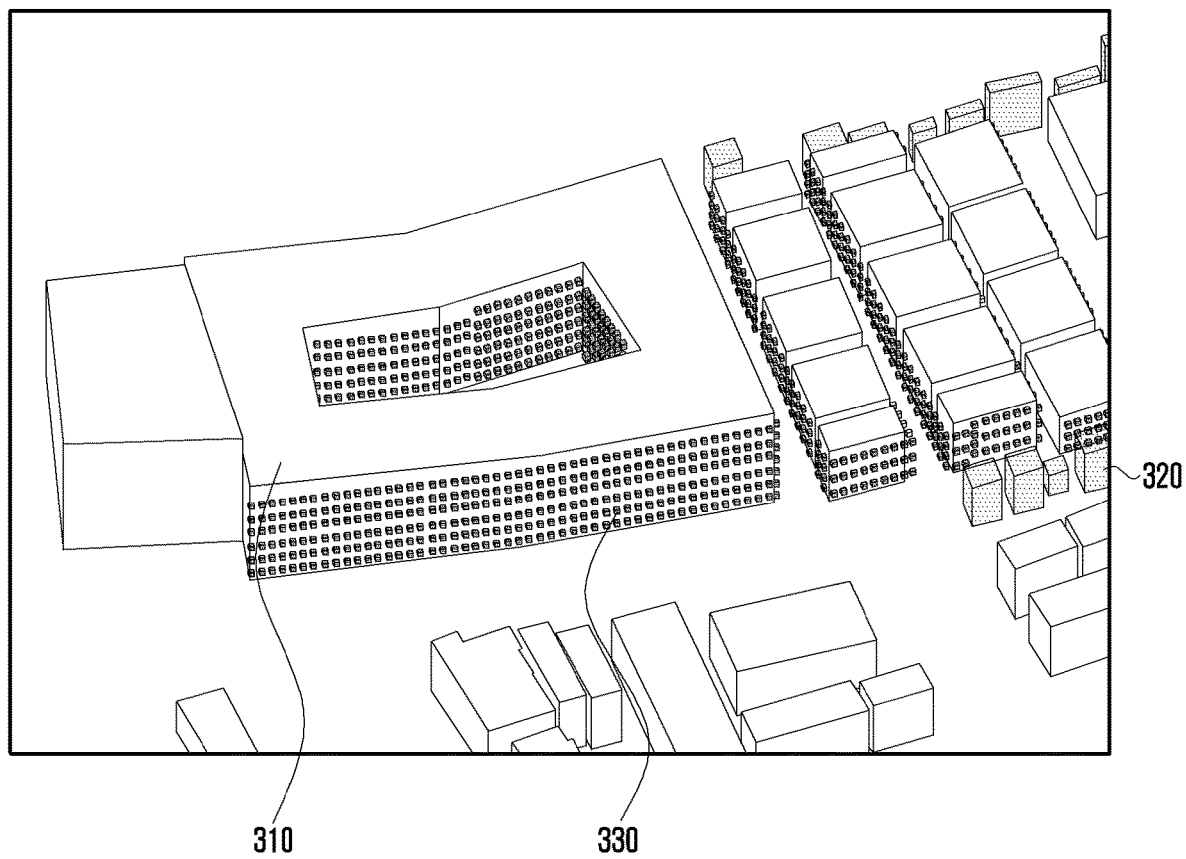

FIGS. 3A and 3B are diagrams for explaining a method for acquiring 3-dimensional map information according to an embodiment of the disclosure.

In reference to FIGS. 3A and 3B, it may be possible to acquire the 3-dimensional map information based on real image information of FIG. 3A and location information corresponding to the image information. In detail, the 3-dimensional map information of FIG. 3B for use in a ray tracing simulation may be acquired based on the image information.

In FIG. 3B, the map information may include a building 310, candidate receiver locations 330, and trees 320. On the basis of the acquired map information, it is possible to determine candidate transmitter and receiver locations and perform a ray tracing simulation based on the determination results to determine at least one of the best locations of the transmitter or receiver.

In an embodiment, it may be possible to improve the accuracy of a simulation result by performing the simulation in consideration of surface materials and the appearance of an element such as the building 310 that may have a property of reflecting or dispersing a radio wave.

In an embodiment, a radio wave may experience significant signal attenuation by some elements such as the trees 320 in comparison with that by the air, even though it can penetrate the trees 320. It may be possible to improve the accuracy of a simulation result by perform the simulation in consideration of the characteristic of the radio wave propagation through objects such as the tree 320.

In an embodiment, the candidate receiver locations may be selectively determined through ray tracing and include locations where a fixed or mobile receiver is placed. In detail, it may be possible to install a receiver around a window of the building 310 in order for the receiver to relay a signal from a transmitter located outside the building 310 to another receiver located inside the building 310 through the window. By performing the ray tracing simulation in consideration of the candidate receiver locations 330, it is possible to acquire a simulation result value reflecting a better signal reception environment.

Figure 4A:
FIGS. 4A and 4B are diagrams for explaining a method for acquiring material information of an object in an image based on image information according to an embodiment of the disclosure.
Figure 4B:
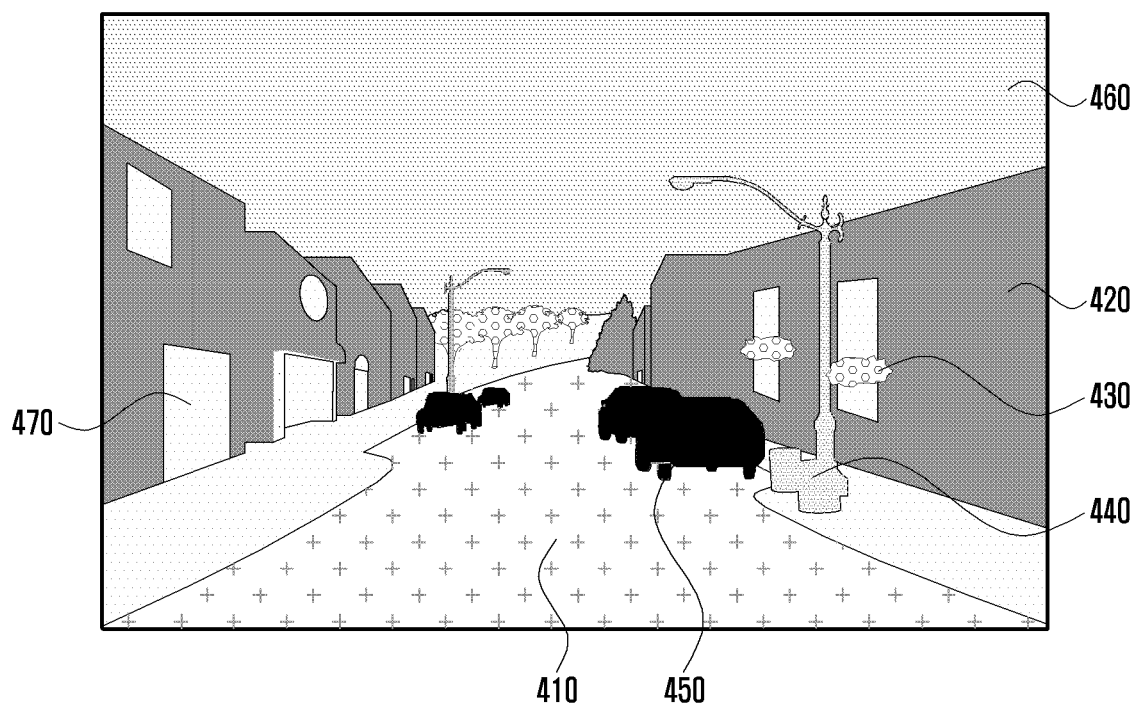

FIGS. 4A and 4B are diagrams for explaining a method for acquiring material information of an object in an image based on image information according to an embodiment of the disclosure.

In reference to FIGS. 4A and 4B, it is may be possible to identify the material of an object displayed in the image. In detail, it may be possible to identify the material of an object in the image using a deep learning-based computer vision technology with the image information. Features of the deep learning-based computer vision technology are described later in detail.

In an embodiment, it may be possible to acquire a result as shown in FIG. 4B by analyzing the image information of FIG. 4A. At least one of colors, light and shade, reflexibility, or relationship among elements expressed in the image may determine each element. In an embodiment, it may be possible to identify materials such as asphalt 410, concrete 420, plants 430, a steel structure 440, a vehicle 450, sky 460, and glass 470 through image analysis. In this way, it is possible to acquire an accurate simulation result by identifying the materials of the elements displayed in the image based on the image information and reflecting the characteristics of the materials to the ray tracing simulation.

Figure 5:
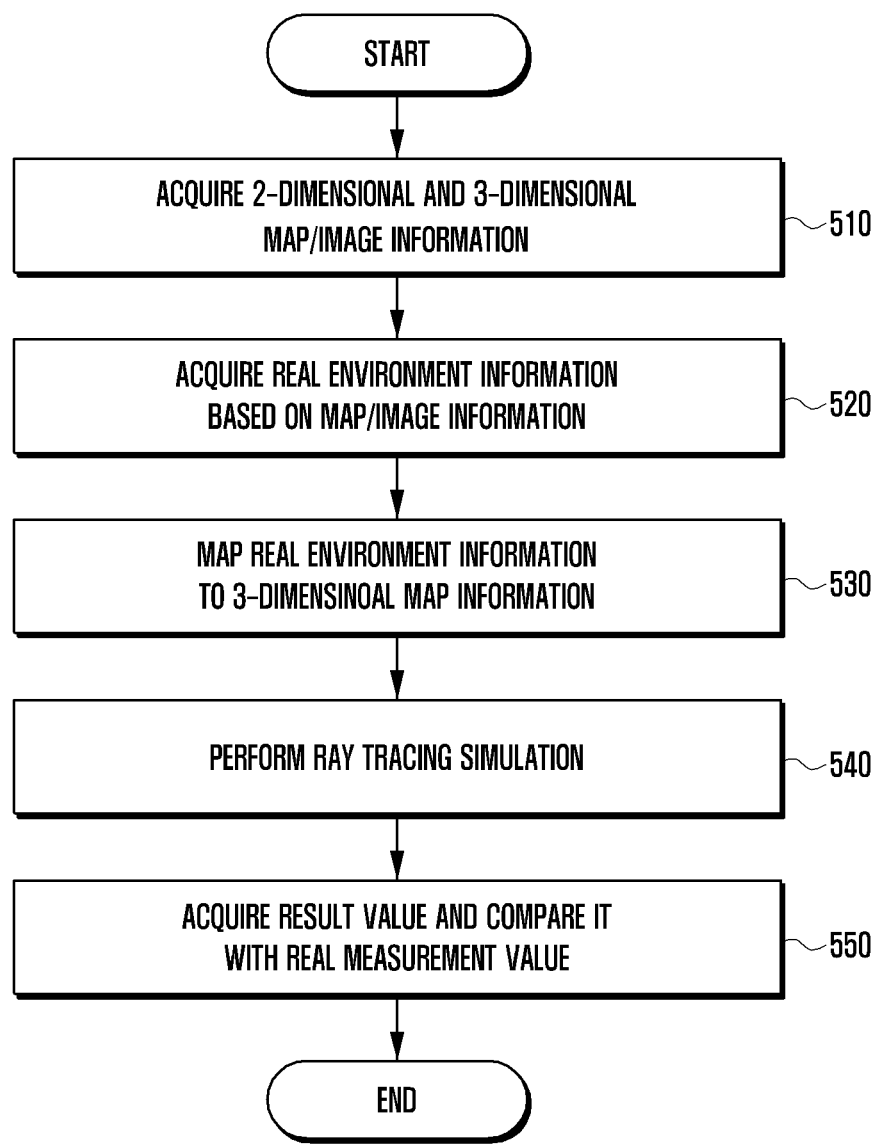
FIG. 5 is a flowchart illustrating a ray tracing-based communication channel environment analysis method according to an embodiment of the disclosure.

FIG. 5 is a flowchart illustrating a ray tracing-based communication channel environment analysis method according to an embodiment of the disclosure.

In FIG. 5, a method for performing a ray tracing simulation is disclosed. In an embodiment, a ray tracing simulation may be performed by a computing device including a controller. The computing device may be a device including a central control processor such as a personal computer and a workstation. The following description is made under the assumption that a simulation is performed by a computing device.

At step 510, the computing device may acquire 2-dimensional (2D) image information and 3-dimensional (3D) map information. According to an embodiment of the disclosure, the 2D image information may include additional information thereof, and the additional information may include shooting information including shooting location, shooting direction, and shooting angle. It may be possible to produce a 3D map corresponding to the 2D image information based on the additional information. The 3D map may include location information and 3D object information corresponding to the location information. The 3D object information may include information on the appearances of buildings, structures, and plants on the land and/or water surface; according to an embodiment of the disclosure, the 3D object information may also include information on at least one of candidate transmitter and receiver positions.

At step 520, the computing device may acquire real environment information based on at least one of the map information or the image information. The real environment information may include objects on a communication path and characteristics of the objects. In detail, it may be possible to acquire information on the characteristics of the potential objects on the communication path by analyzing the 2D image. The characteristics of an object may include at least one of the surface material or appearance of the object and, in the case of an object allowing penetration of a radio wave, even information on the shape and signal attenuation degree when the radio wave penetrates the object. Basically, the real environment information may also include information on a type, shape, height, and width or breadth of the object. In an embodiment, real environment extraction may be performed through a deep learning technique. In detail, in an embodiment, the computing device may perform machine learning with a database containing category information corresponding to an object to be extracted from the image and extract, if a target image is input based on the learning result, and identify the category of the extracted object. In more detail, examples of a real environment object affecting the radio environment may include various obstacles such as foliage and material of the exterior wall of a building. For the case of an obstacle affecting the radio environment, the machine learning may be performed to extract at least one of type, height, or width or breadth as well as the obstacle's location for more accurately predicting propagation paths. In order to make it possible to determine the receiver and transmitter installation locations automatically, it may be possible to extract environmental objects such as roads, streetlamps, poles, rooftops, and windows.

At step 530, the computing device may map the real environment information of the communication path to the 3D map based on the information acquired at steps 510 and 520. It may also be possible to map the additional information acquired from the 2D image to the objects in the 3D map based on the additional information included in the 2D image information when mapping the acquired information to the 3D map. In an embodiment, the computing device may generate 3D map information reflecting the real environment based on the information on the objects extracted at step 520. According to an embodiment, the computing device may map the information on obstacles such as foliage and objects such as poles and rooftops to a commercial map and map the predicted material and windows to the 3D building shape. The material information on the obstacles and buildings may be categorized according to the degree to which the radio characteristics are affected and be processed into variables through a lookup table and mapping function so as to be reflected afterward to a ray tracing simulation.

At step 540, the computing device may perform the ray tracing simulation based on the information generated at step 530. In an embodiment, the ray tracing simulation may be performed in consideration of a beam in a certain direction by changing the beam information in sequence or under the assumption that the transmitter transmits beams covering all directions during the same time period. It may be possible to predict and analyze the received signal quality at the position of a receiver by reflecting the propagation paths of the signal transmitted from a transmitter to the receiver and the real environment information on the propagation paths that are acquired as a result of the ray tracing simulation. In an embodiment, it may be possible to determine at least one of a transmitter's position and a receiver's position based on the 3D map and estimate the signal transmission environment based on the mapping information generated at step 530 through the ray tracing simulation.

At step 550, it may be possible to acquire the result value of the ray tracing simulation and then perform the ray tracing simulation again based on the acquired result value and a value acquired by performing measurement in the real environment. In detail, if a result of a comparison shows that the simulation result value and the real environment measurement value are different from each other, it may be possible to change the information acquired at step 520 based on the real environment measurement value to generate a new simulation result value. By performing the ray tracing simulation by reflecting the real environment information to the 3D map, it is possible to improve the reliability of the communication channel analysis. In detail, it may be possible to install the transmitter and the receiver in ray tracing simulation target areas and add or update the basic information for performing the ray tracing simulation based on the value acquired when the receiver receives the signal transmitted by the transmitter.

As described above, it may be possible to determine the best position of at least one of the transmitter and receiver for providing radio communication service in a certain area on the map based on the ray tracing result. It may be possible to perform network planning efficiently by determining the best position of at least one of the transmitter and receiver as above. That is, it may be possible to determine the best position of a base station for providing terminals with the radio communication service effectively in a certain area. By determining the best positions of base stations, it may become possible to provide terminals with communication services effectively with the installation of as small a number of base stations as possible.

It may also be possible to manage the network adaptively by reflecting the information on the received signal strength in the real environment. In detail, if the ambient environment is changed after installing a transmitter, it may be possible to perform additional ray tracing simulation in consideration of the changed environment and perform network management by adjusting the position of the transmitter by reflecting the ray tracing simulation result. The network management may further include changing the information on the beam formed by the transmitter in addition to adjusting the position of the transmitter. In detail, the transmitter may determine the Tx beam and Rx beam based on the ray tracing simulation result value. In order to determine the Tx and Rx beams, it may be possible to perform a beam arrangement based on the ray tracing simulation result value. Such an adaptive network management may be performed periodically.

Figure 6:
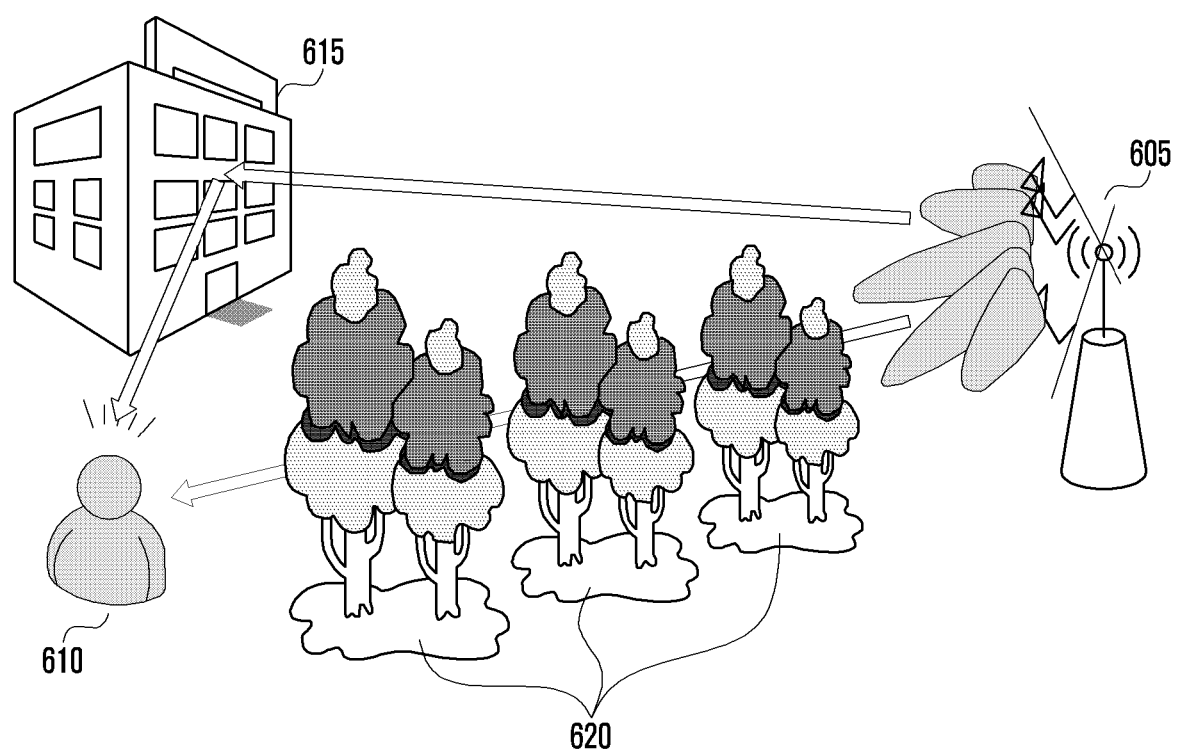
FIG. 6 is a diagram illustrating a signal propagation environment according to an embodiment of the disclosure.

FIG. 6 is a diagram illustrating a signal propagation environment according to an embodiment of the disclosure.

In reference to FIG. 6, a transmitter 605 may transmit a signal to a receiver 610 owned by a user. The transmitter 605 may form a beam to transmit the signal. The beam may be formed and adjusted based on channel information in order for the receiver 610 to receive the signal at a predetermined level or higher.

In an embodiment, the signal transmitted by the transmitter may be received after being reflected by a building 615. In an embodiment, the signal transmitted by the transmitter 605 may be received after penetrating trees 620. In an embodiment, the building 615 and trees 620 are just examples of objects that reflect the signal or through which the signal passes. In order to analyze the environment in which the signal transmitted by the transmitter 605 is delivered to the receiver 610, it may be necessary to consider the influence of the building 615 and trees 620 to the signal propagation. In detail, it may be necessary to consider the surface material and appearance of the building 615 and foliage sizes, trunk sizes, foliage density, and foliage appearance characteristics of the trees 620. By taking the characteristics of the objects that may be placed on the propagation paths into consideration, it is possible to obtain more accurate propagation path values.

Figure 7:
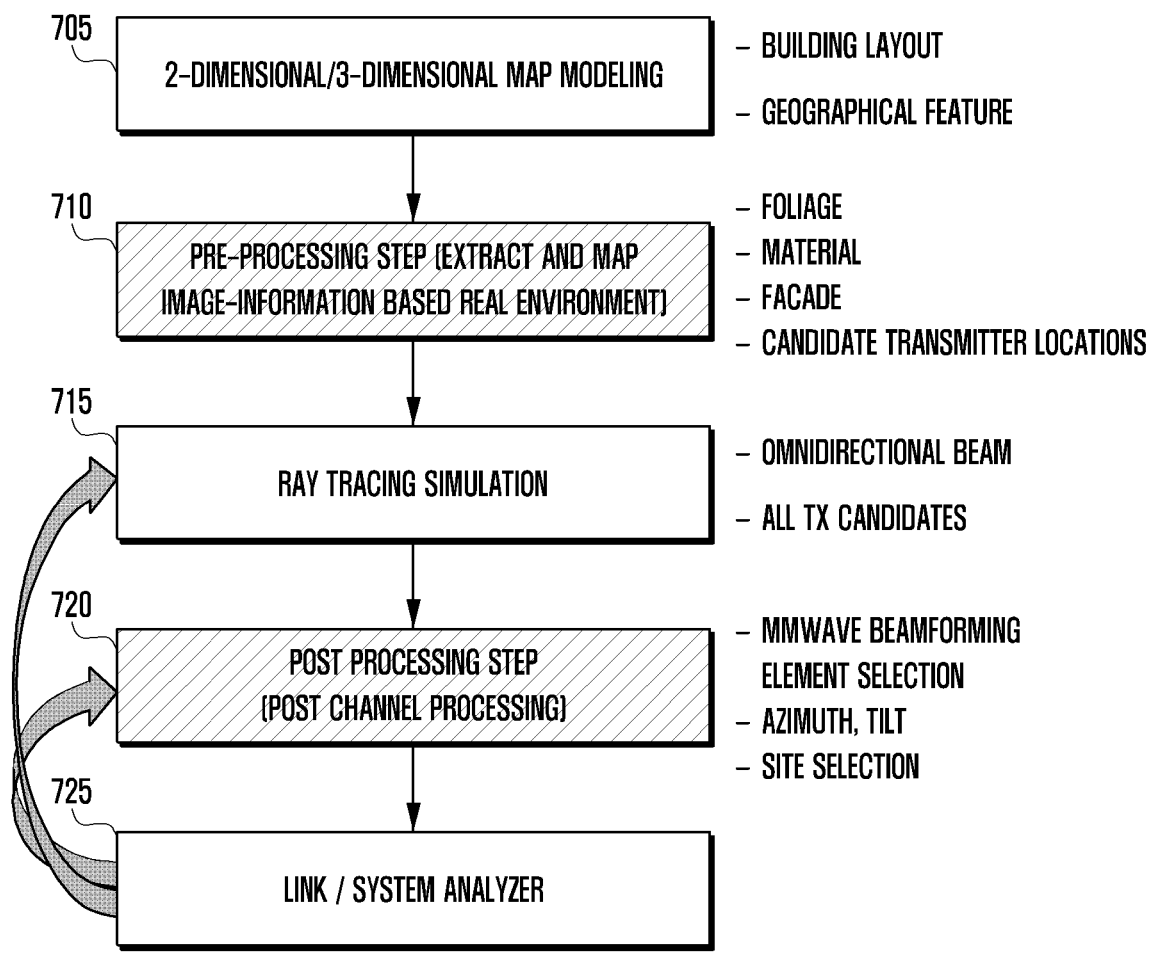
FIG. 7 is a flowchart illustrating a ray tracing simulation-based communication environment analysis method according to an embodiment of the disclosure.

FIG. 7 is a flowchart illustrating a ray tracing simulation-based communication environment analysis method according to an embodiment of the disclosure.

FIG. 7 is directed to a method for performing a ray tracing simulation and analyzing links and communication system information based on the simulation result.

At step 705, a computing device acquires 2-dimensional image information and 3-dimensional map information and perform a modeling based on the acquired information. In detail, the computing device may extract information on layouts of objects including buildings and ground distribution based on at least one of the 2-dimensional map information or the 3-dimensional map information. Such information may be extracted by analyzing the 3-dimensional image information for use afterward in analyzing signal propagation characteristics. Such information may include shapes of building, structures, and plants on earth and water surfaces.

At step 710, the computing device may perform a preprocessing step for a ray tracing simulation. In an embodiment, the preprocessing step may include acquiring real environment information based on at least one of the map information or the image information. The real environment information may include objects placed on communication paths and characteristics of the objects. The characteristics of the objects may include at least one of foliage that is likely to be located or surface materials or facades of the objects that are located on the 3-dimensional map. In an embodiment, the facade of an object may include the shape of the object. In an embodiment, candidate transmitter locations may be identified on the map produced through modeling. The candidate transmitter locations may be determined based on at least one of currently deployed base station information, building information, road information, or distribution of users. In an embodiment, the candidate transmitter locations may be narrowed down to the least number.

In an embodiment, the computing device may analyze the 2-dimensional image information to identify the characteristics of the objects that may be placed on the communication paths. The characteristics of the objects may include at least one of surface materials or appearances of the objects or, in the case of an object allowing penetration of a radio wave, the information on the shape of the object and signal attenuation degree when the radio wave penetrates the object.

The information acquired at the preprocessing step may be mapped to the map obtained through modeling at step 705. In more detail, it may be possible to map at least one of the surface material or outside material corresponding to an identified building layout to the building layout.

At step 715, the computing device may perform a ray tracing simulation based on the information acquired at steps 705 and 710. In an embodiment, the ray tracing simulation may be performed in such a way of changing beam information in consideration of the corresponding beam direction or under the assumption that the transmitter forms a beam in all directions in which it can transmit in the same time period. In more detail, in an embodiment, it may be possible to perform the ray tracing simulation under the assumption that omnidirectional beams are transmitted from all of the candidate transmitter locations. It may be possible to predict signal qualities at a receiver based on the propagation paths of the signal from the transmitter to the receiver, as a result from the ray tracing simulation, and analyze the predicted signal qualities. In an embodiment, the ray tracing simulation may be performed in such a way of determining at least one of transmitter locations or receiver locations based on the 3-dimensional map information and identify the signal transmission environment based on the information mapped at step 710. In an embodiment, the omnidirectional beams may include transmitting signals under the assumption that individual transmitters form the omnidirectional beams for transmitting the signals in their available directions. All candidate transmitters may include all candidate transmitter locations that are considered in performing the ray tracing simulation.

At step 720, the computing device may perform a postprocessing (post channel processing) based on the ray tracing result. In detail, the computing device may perform additional arithmetic operations in consideration of mmWave beamforming elements, beam azimuths, and beam tilts obtained based on a result from the ray tracing simulation performed at step 715 under the assumption of omnidirectional beamforming at all candidate transmitters, and individual transmitter sites. In more detail, an additional result value may be obtained by applying changed consideration elements to the result value obtained at step 715. In an embodiment, the post-processing may be selectively performed.

At step 725, the computing device may analyze the radio communication link based on the result of the post-processing to estimate the total transmission throughput of the communication system. Furthermore, it may be possible to perform an additional ray tracing simulation by reflecting the real measurement result or an additional post-processing based on the additional ray tracing simulation result.

Figure 8:
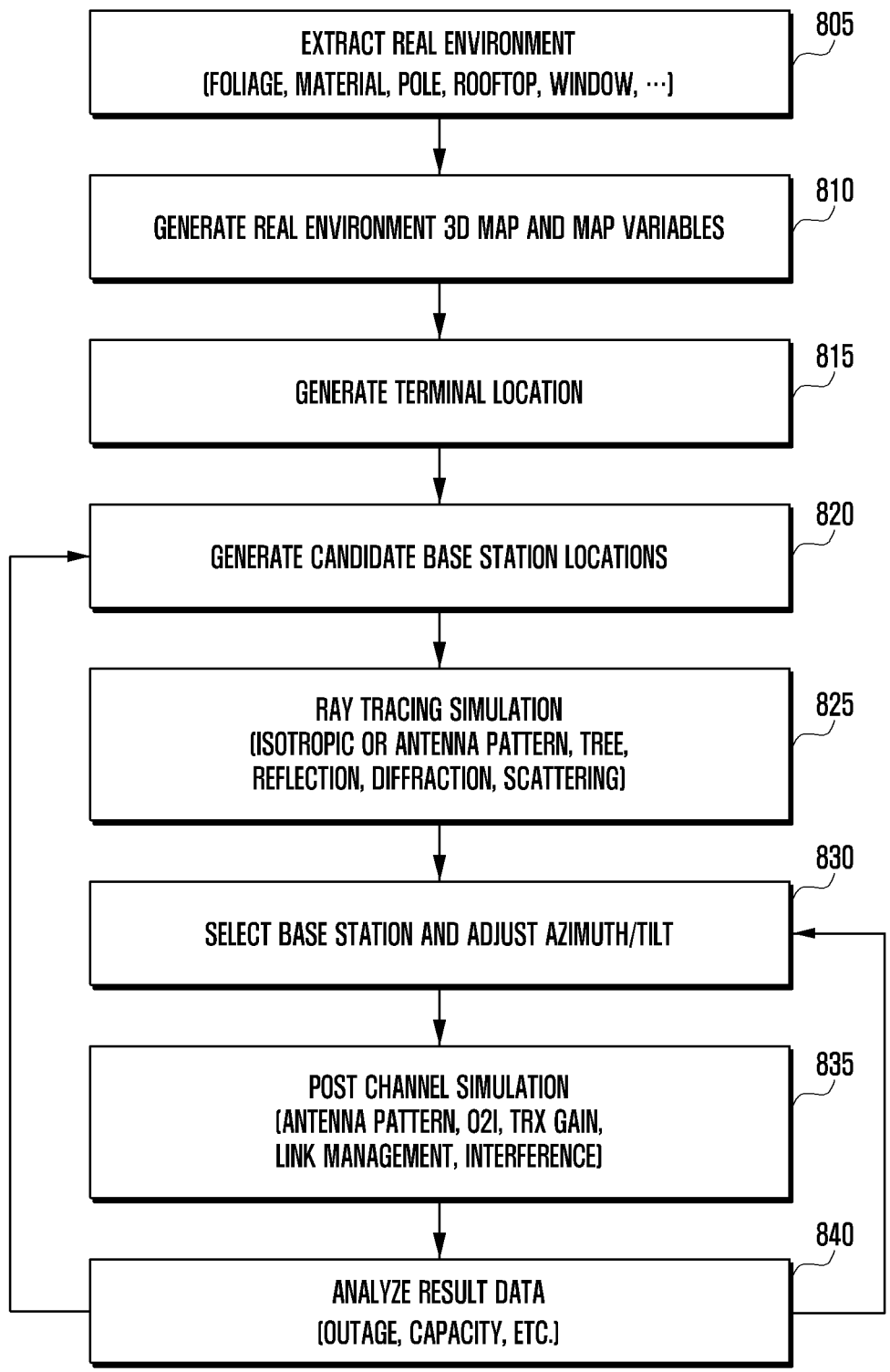
FIG. 8 is a flowchart illustrating a ray tracing simulation-based communication environment analysis method according to an embodiment of the disclosure.

FIG. 8 is a flowchart illustrating a ray tracing simulation-based communication environment analysis method according to an embodiment of the disclosure.

In reference to FIG. 8, a computing device according to an embodiment may analyze a communication environment through a ray tracing simulation.

At step 805, the computing device may extract information on real environment elements required for mmWave RF planning from the map information of a target area for the communication environment analysis. In detail, the computing device may extract information on the real environment elements from the image information; in an embodiment, the real environment elements may include at least one of surface materials of objects including foliage, roads, poles, rooftops, or windows.

At step 810, the computing device may map the extracted real environment elements to a 3-dimensional map model, the extracted real environment elements being considered in simulation.

At step 815, the computing device may determine a receiver location based on the information acquired at the previous steps. In an embodiment, the receiver may be a terminal. In detail, the computing device may determine candidate areas where the receiver is likely to be located based on at least one of layouts of buildings or real environment elements extracted from the 3-dimensional map information.

At step 820, the computing device may determine candidate transmitter locations based on the information acquired at the previous steps. In an embodiment, the transmitter may be a base station. In more detail, the computing device may determine candidate areas where the transmitter is likely to be located based on at least one of layouts of buildings or real environment elements extracted from the 3-dimensional map information. According to an embodiment, the computing device may determine the candidate locations at which the transmitter is likely to be located in a target area for the communication environment analysis; the determined candidate locations may outnumber a number of transmitters to be actually installed afterward.

In an embodiment, steps 815 and 820 may be performed in reverse order or in parallel.

At step 825, the computing device may perform a ray tracing simulation. In detail, the computing device may analyze the information determined or acquired at the previous steps to estimate possible radio wave propagation paths from a transmitter to a receiver and any influence caused by the objects on the paths. In an embodiment, the ray tracing simulation may be performed under the assumption of signal transmission with an isotropic antenna pattern or a specific antenna pattern. In the case of using the isotropic antenna pattern, it may be possible to form an omnidirectional beam to transmit a signal at a regular power level. In an embodiment, using the isotropic antenna pattern may include at least one of transmitting a signal without beamforming in a specific direction or forming a beam in all directions at the same power level. In an embodiment, the isotropic antenna pattern may include an antenna pattern with physical properties identical in all directions.

The simulation may be performed on the basis of information reflecting the real environment such as trees on the map, a reflection coefficient, a diffraction coefficient, and a scattering coefficient.

At step 830, the computing device may adjust an azimuth and tilt of a beam based on a ray tracing result value. In more detail, the computing device may select one of candidate transmitter areas. In a communication system employing a beamforming technique for transmitting mmWave signals effectively, a selected base station may adjust the azimuth and tilt of a beam that determine signal propagation properties. In an embodiment, it may be possible to perform the ray tracing simulation under the assumption that the transmitter transmits an isotropic beam, adjusts the azimuth and tilt of the beam based on a simulation result value, and determines additional signal transmission properties based on the adjustment result.

At step 835, the computing device may perform a post channel simulation. In detail, the computing device may perform an additional operation by reflecting antenna pattern (beamforming), outdoor-to-indoor (O2I), MIMO, and TRx gain and loss values to the information on the ray from the transmitter and the receiver that is obtained through the ray tracing simulation. The computing device may perform link management in such a way of calculating and reflecting impact of interference of signals from other base stations. In an embodiment, the computing device may select a base station and adjust azimuth/tilt at the post channel simulation step.

At step 840, the computing device may analyze the information acquired through the simulation procedure and perform network planning based on the analysis result. In detail, the computing device may analyze the ray data between the transmitter and the receiver that are acquired through the simulation check for capacities of the transmitter and receiver and outage in the simulation area. If the simulation result does not satisfy a desired level, the computing device may perform step 820 or 830 again. The computing device may perform the step of determining the candidate transmitter locations again according to the result data analysis.

Figure 9A:
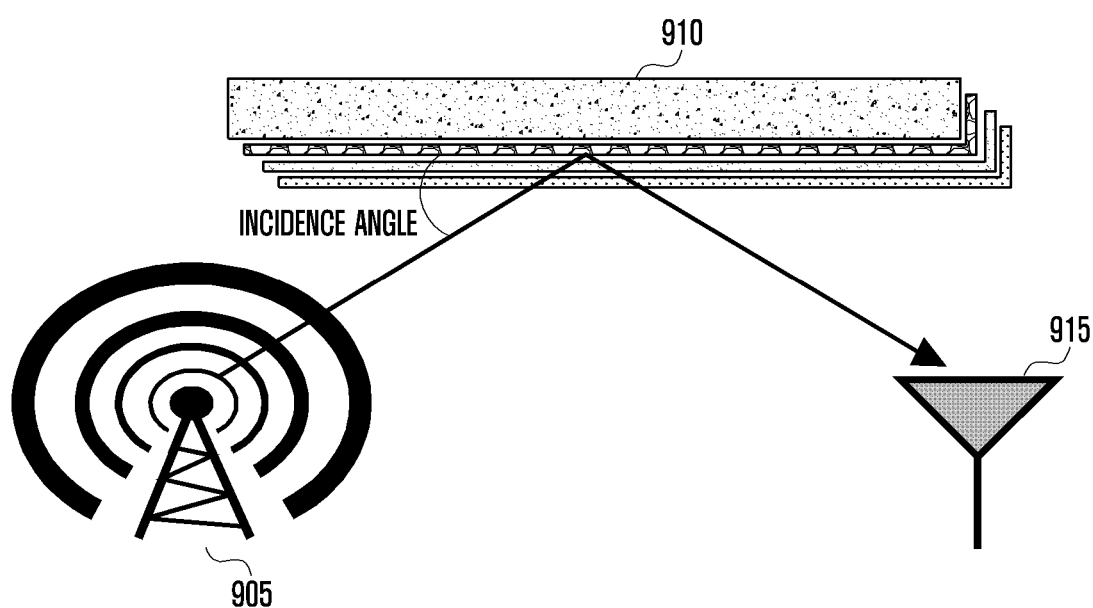
FIGS. 9A to 9C are diagrams for explaining a method for analyzing signal propagation characteristics in consideration of a material of an object according to an embodiment of the disclosure.
Figure 9B:
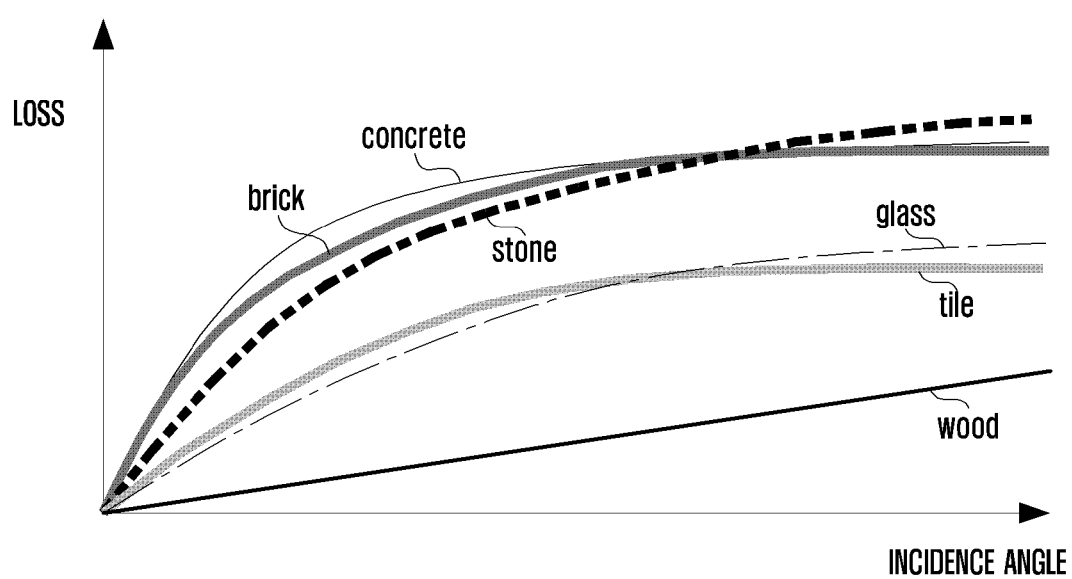
Figure 9C:
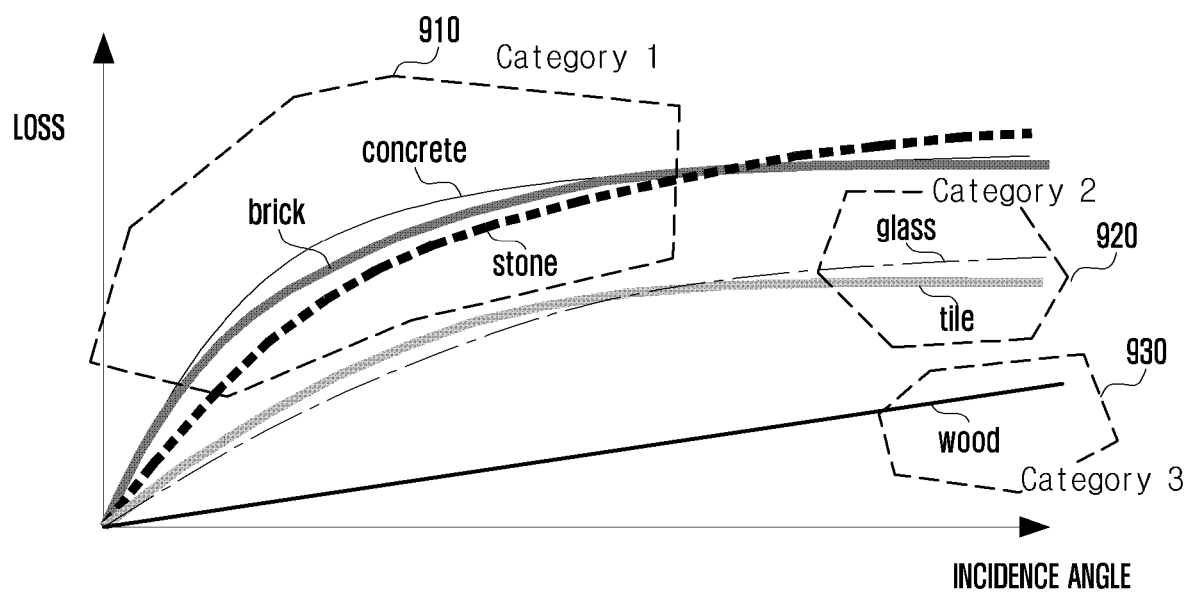

FIGS. 9A to 9C are diagrams for explaining a method for analyzing signal propagation characteristics in consideration of a material of an object according to an embodiment of the disclosure.

In reference to FIGS. 9A to 9C, a signal transmitted by a transmitter 905 may be reflected on an object 910 and then received by a receiver 915. The signal may be incident on the surface of the object 910 at an incidence angle and attenuated differently according to the surface material of the object 910 and the incidence angle. FIG. 9B shows change of signal loss according to the surface material of the object and incidence angle of the signal. Examples of the material may include brick, concrete, stone, glass, tile, wood, and a material for example a steel may also be considered. When the signal is reflected on each surface material, the signal loss rate may be considered according to the incidence angle. For example, the signal loss rate increases as the incidence angle becomes wider.

In an embodiment of the disclosure, some surface materials may have similar reflection characteristics. For example, brick, concrete, and stone may have similar reflection characteristics, and glass and tile may have similar reflection characteristics.

In reference to FIG. 9C, it may be possible to group the materials with similar reflection characteristics into the same categories as denoted by reference numbers 910, 920, and 930. Although it is possible to reflect the material-specific characteristic in a simulation, it is preferable to perform the simulation by reflecting category-specific characteristics to reduce the computation amount. The reflection characteristic of a category may be determined by the average value of the characteristics of the materials included in the same category. In addition, weights can be given when averaging is performed, and weights can be determined by assigning a high weight to a material frequently located in a measurement area to determine a reflection characteristic of the category.

In an embodiment, the reflection characteristic may be expressed using a parameter such as permittivity, transmittivity, diffraction coefficient, and reflectivity, and the category-specific reflection characteristics may be determined as in Table 1.

TABLE 1

| Items | Permittivity | Transmittivity | Diffraction coefficient | ... |
|---|---|---|---|---|
| Category 1 | 7 | 0.8 | 0 | |
| Category 2 | 11 | 0.62 | 0.5 | |
| Category 3 | 25 | 0.52 | 1 | |
| Category 4 | ... | ... | | |

By grouping the materials in consideration of their reflection characteristics, it is possible to improve the accuracy of a simulation result and reduce the computation amount.

Figure 10A:
FIGS. 10A to 10C are diagrams for explaining a method for analyzing propagation characteristics of a signal in consideration of appearances of objects according to an embodiment of the disclosure.
Figure 10B:
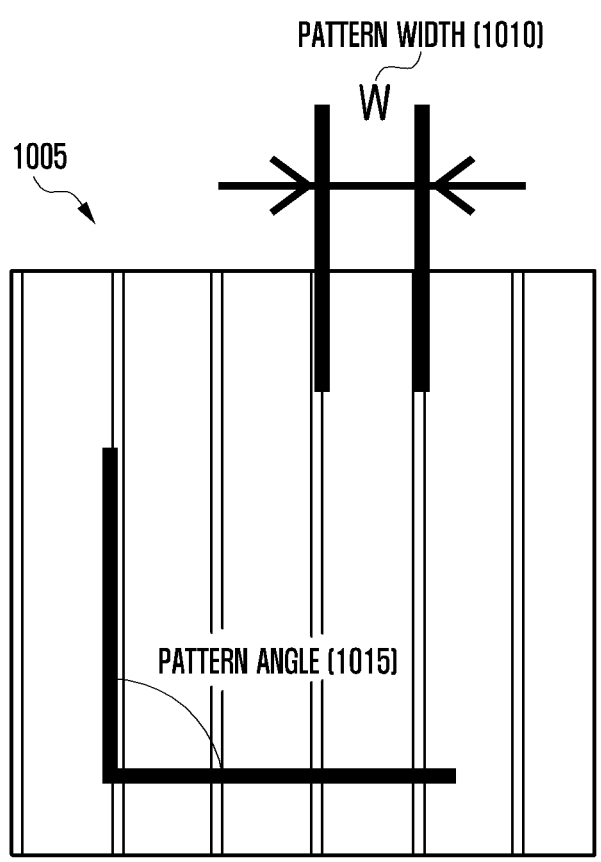
Figure 10C:
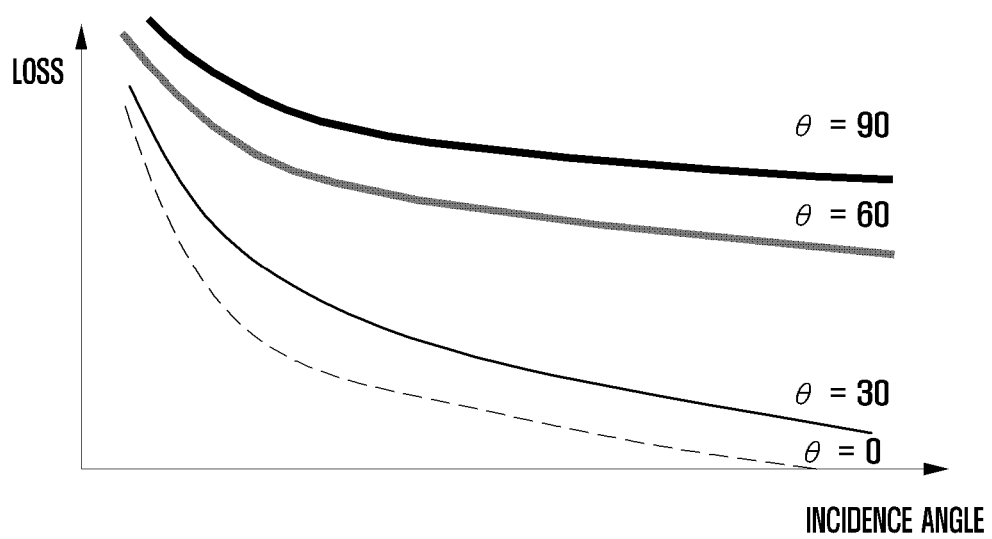

FIGS. 10A to 10C are diagrams for explaining a method for analyzing propagation characteristics of a signal in consideration of appearances of objects according to an embodiment of the disclosure.

In reference to FIGS. 10A to 10C, it may be possible to analyze the propagation characteristic of a radio wave based on the appearance of an object identified in a 2D image. In detail, the computing device may determine the contours of the object with a certain pattern when identifying the object in the 2D image. In an embodiment, the object may have an appearance with a repeating pattern.

Referring to FIG. 10A, it is possible to identify the pattern area 1005 in which the grooves in the longitudinal direction exist in the embodiment. Such discrimination can be identified based on the change in the shape of the pattern and the change in color when there are repeated patterns in the two-dimensional image.

Referring to FIG. 10B, in the pattern area 1005, the width of the groove in the vertical direction is w (1010), and the pattern angle 1015 with the index is 90 degrees. Thus, detailed information of the pattern can be collected, and the reflection characteristic of the radio wave can be analyzed as shown in FIG. 10C based on the angle formed by the pattern and the distance between the patterns. When the pattern angle is 90 degrees, the loss due to the incident angle of the radio wave may be largest. As described above, it is possible to determine the reflection characteristics of the radio wave in consideration of the angles and the widths of the respective patterns, and more accurate radio wave transmission characteristics can be determined by reflecting such characteristics in the simulation.

Figure 11:
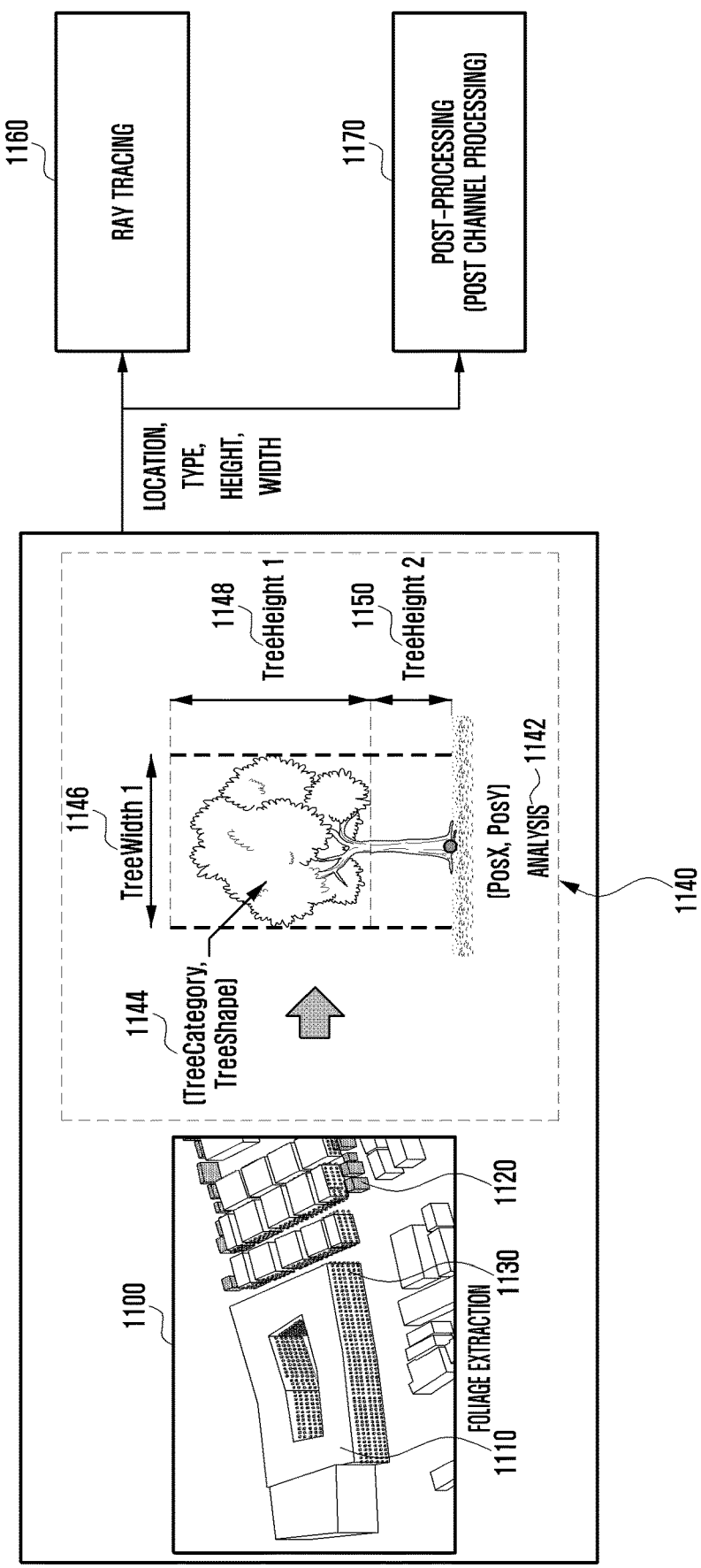
FIG. 11 is a diagram for explaining a method for analyzing a communication environment in consideration of foliage according to an embodiment of the disclosure.

FIG. 11 is a diagram for explaining a method for analyzing a communication environment in consideration of foliage according to an embodiment of the disclosure.

Referring to FIG. 11, the computing device of the embodiment can determine the location of the leaves 1120 in the three-dimensional map information 1100.

It may be possible to extract characteristics of the foliage 1120 based on an image 1140 corresponding to the foliage 1120. In an embodiment, it may also be possible to extract information on a building 1110 and windows 1130. Such information extraction may be performed through image analysis, and the extracted information may determine a location 1142 of the foliage 1120 as denoted by reference number 1142, a category and shape of the tree as denoted by reference number 1144, a width of the tree as denoted by reference number 1146, and a height of the tree as denoted by reference numbers 1148 and 1150. In an embodiment, the height of the tree may be the sum of a height of a trunk as denoted by reference number 1150 and a height of foliage and branches as denoted by reference number 1148. The image analysis may be performed based on a result of deep learning through machine learning.

The information extracted as above may be reflected to at least one of ray tracing 1160 or post-processing 1170 to derive reliable result values.

Figure 12:
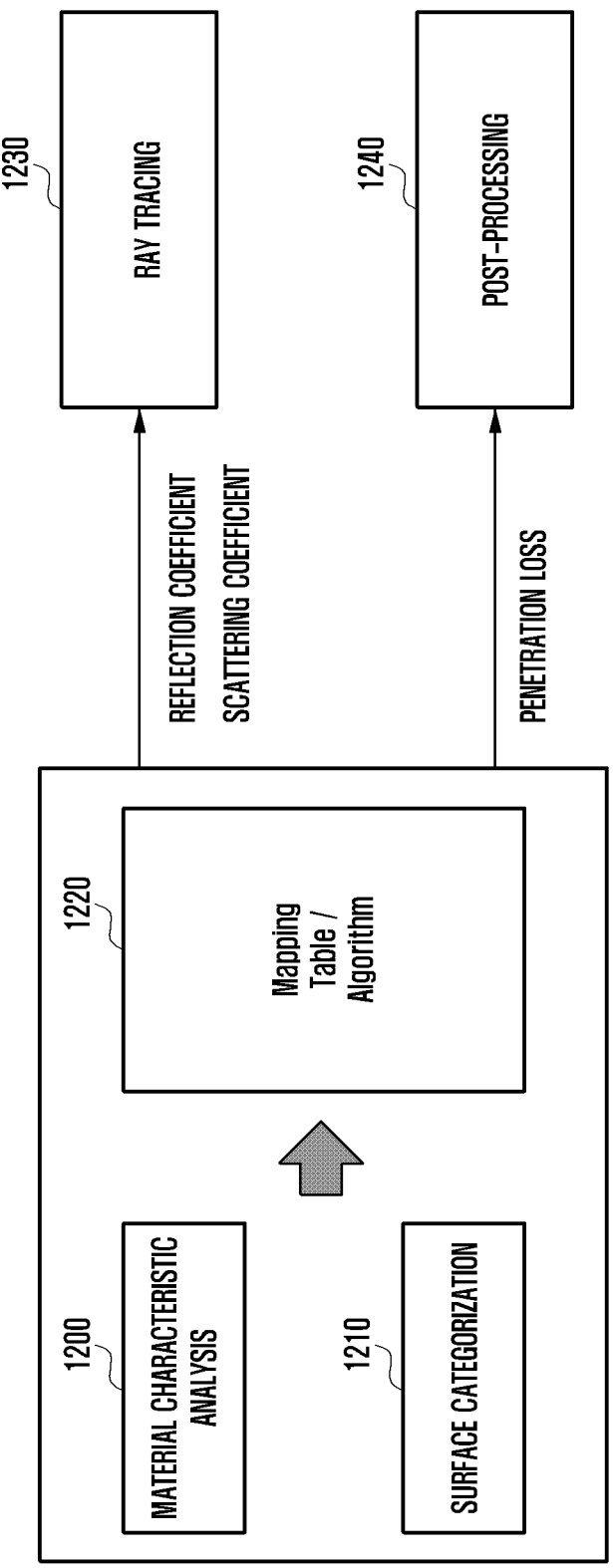
FIG. 12 is a diagram for explaining a method for analyzing a communication environment in consideration of surface materials and appearances of objects according to an embodiment of the disclosure.

FIG. 12 is a diagram for explaining a method for analyzing a communication environment in consideration of surface materials and appearances of objects according to an embodiment of the disclosure.

In the embodiment of FIG. 12, a computing device may perform material characteristic analysis 1200 and surface characteristic analysis 1210 based on image information corresponding to 3-dimensional map information. The image analysis may be performed based on the results of the deep learning through machine learning. Through such analysis, the extracted information can be classified into a table for mapping and an algorithm to be applied to the raytracing can be analyzed (1220). The information thus obtained may include at least one of a reflection coefficient, a scattering coefficient, and a transmission loss, and such information may be reflected in at least one of ray tracing 1230 and post-processing 1240.

Figure 13:
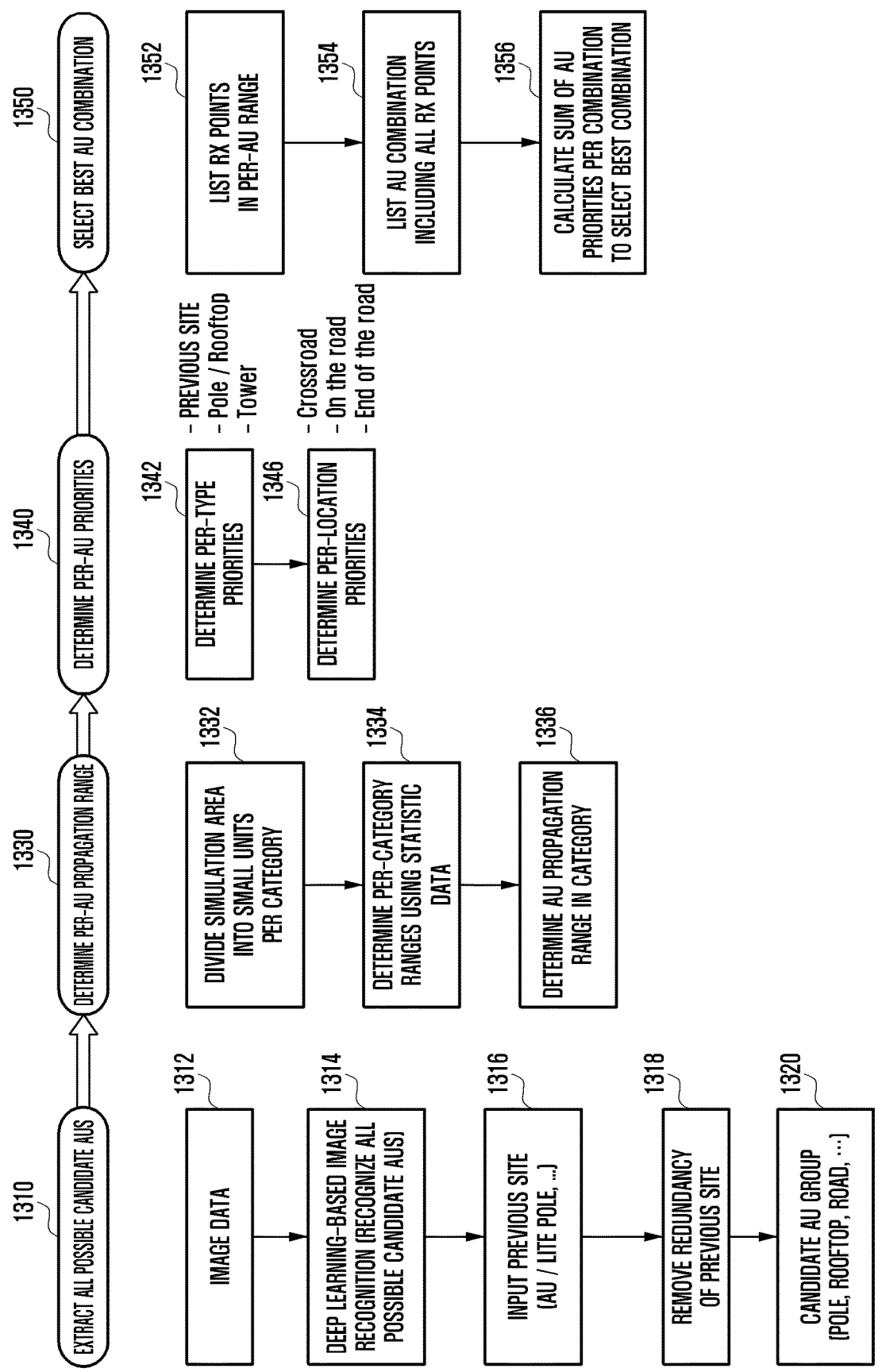
FIG. 13 is a diagram for explaining a transmitter location determination procedure in a communication environment analysis method according to an embodiment of the disclosure.

FIG. 13 is a diagram for explaining a transmitter location determination procedure in a communication environment analysis method according to an embodiment of the disclosure.

In the embodiment of FIG. 13, a computing device may determine a transmitter location for radio network planning. In an embodiment, the transmitter location may be referred to as access unit (AU).

In an embodiment, the computing device may extract all possible candidate AUs at step 1310. At step 1330, the computing device may determine transmission ranges of the extracted candidate AUs. At step 1340, the computing device may prioritize the AUs for which the transmission ranges have been determined. At step 1350, it may be possible to select a combination of the best AUs based on previously obtained information.

Descriptions are made of the respective steps in detail hereinafter.

Concerning the possible candidate AUs extraction, the computing device may receive image data at step 1312. In detail, the computing device may acquire the image information that may correspond to a 3-dimensional map model, and the image information may include additional information such as location, direction, and shooting information. The computing device may map the information acquired from the image data based on the extracted information to the 3-dimensional map model.

In step 1314, the computing device can recognize the position where the AU-capable candidate group can be placed based on the video image. The candidate group position recognition can be performed through deep learning based image recognition.

In step 1316, the computing device receives the existing installed AU, lite pole related information and can correspond to the 3D map model.

At step 1318, the computing device may perform redundancy removal on the information obtained at steps 1314 and 1316. Removing redundancy may include selecting one of multiple candidate AUs within a predetermined range.

In step 1320, the computing device can determine the AU candidate group based on the deduplication result. In an embodiment, the AU candidate group may include at least one of Pole, Rooftop, Road, and tower, and a location where a transmitter is suitably installed to transmit a signal may be designated as an AU candidate group.

Concerning the AU-specific signal propagation range determination, the computing device may divide an area for simulation per category. The division determination may be made based on at least one of a number of AUs to be deployed, a number of receivers requesting for a service, or a simulation load. In an embodiment, the division is made per radio wave propagation range using statistic data based on a real measurement. Table 2 shows characteristics of AUs for categorization.

TABLE 2

| Outdoor Installation of CPE (or SFU) | | | | | | Indoor Installation of CPE (or MDU) | | |
|---|---|---|---|---|---|---|---|---|
| Straight | | | Curved | | | Straight or Curved | | |
| Low | Mid | High | Low | Mid | High | Low | Mid | High |
| 842.05799 | 266.28212 | 47.3524 | 422.02871 | 133.4572 | 23.732419 | 150 | 100 | 50 |

In this way, the AUs may be categorized according to the ambient environment of the installation location.

At step 1330, it may be possible to determine the signal propagation range of the AU belonging to a category based on the determined category.

Concerning the AU prioritization, the computing device may prioritizes the AUs according to AU type at step 1342. Here, the prioritization may include determining a location preferable for installing an AU preferentially in consideration of installation costs and efficiency. In detail, the prioritization may be performed in, but not limited to, the order of the locations where an AU has been previously installed, poles/rooftops, and towers; an AU may be selected from a candidate AU group in consideration of the priority. In an embodiment, a site where a legacy network has been deployed is likely to be prioritized over all other places. This is because of saving costs for securing a new site and maintenance.

In step 1346, priority by location may be determined. The location may include an area where the AU is installed considering the surrounding environment and the like. More specifically, when there are four distances, the intersection will have a higher priority than the end point of the general road, since it would be advantageous to shoot the radio waves at each distance at one site located at the intersection rather than the base station at each four distances. Also, on the road, it is possible to have a higher priority to be installed on a road having a high radio wave reaching distance, and the end portion of the road can have the following priority. Also, the priority associated with the AU installation in the embodiment may be determined according to the information set by the provider.

Concerning the best AU combination selection, the computing device may list, at step 1352, receiver locations within the AU-specific signal propagation range determined at the previous step.

At step 1354, based on such listing information, an optimal AU combination that may include all receivers may be selected. Such a selection can be determined in the direction of installing less AUs. A plurality of combinations of AUs may be determined, and a combination of AUs may be determined based on the maximum number of AUs set by the provider.

At step 1356, the computing device may determine the best AU combination among the AU combinations based on the priority information acquired at step 1340.

Figure 14:
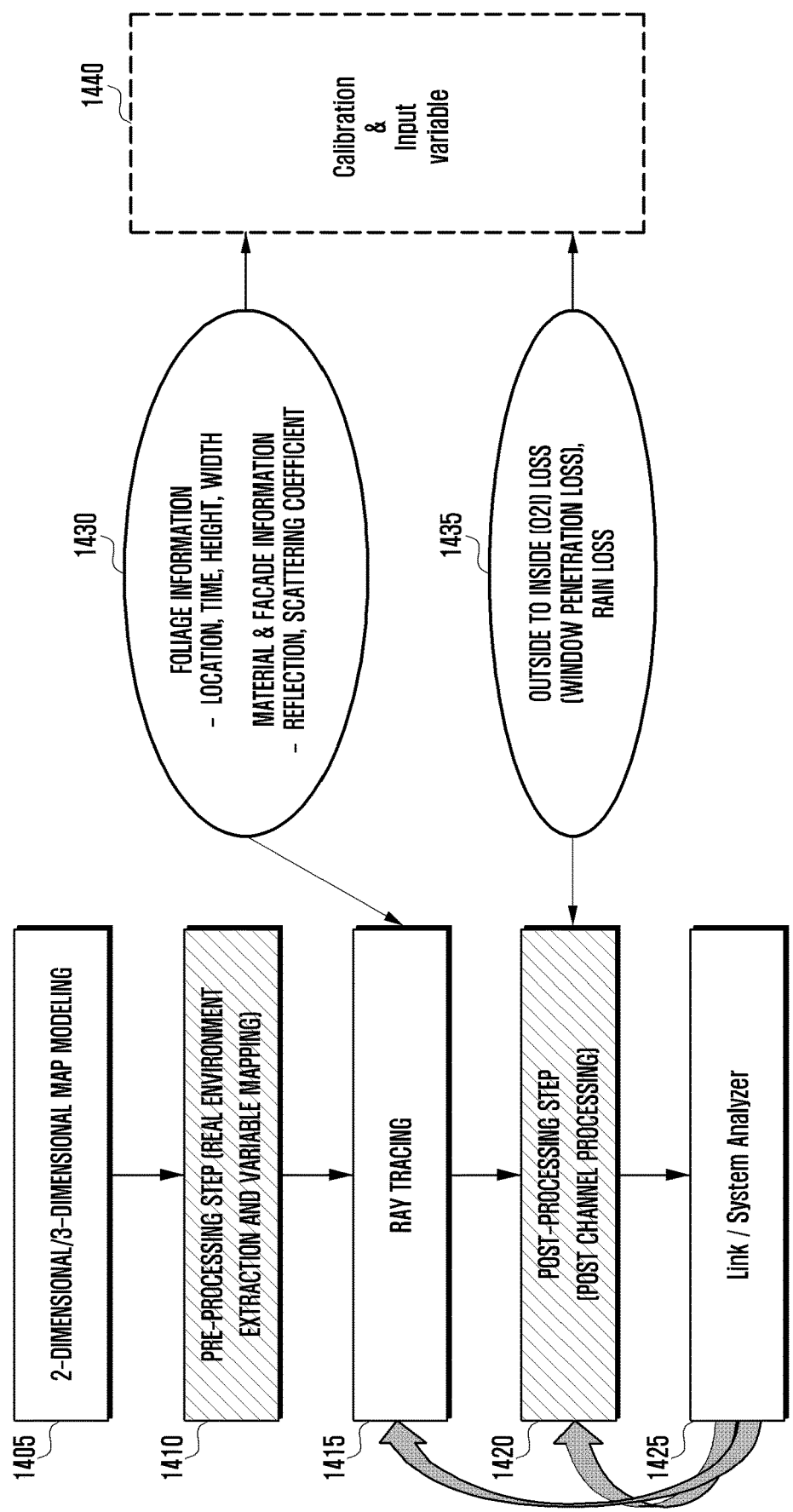
FIG. 14 is a diagram illustrating a ray tracing simulation-based communication environment analysis method according to another embodiment of the disclosure.

FIG. 14 is a diagram illustrating a ray tracing simulation-based communication environment analysis method according to another embodiment of the disclosure.

FIG. 14 is directed to a method for performing a ray tracing simulation and analyzing link and communication system information based on the simulation result.

In step 1405, the computing device may acquire the two-dimensional image information and the three-dimensional map information and perform modeling accordingly. More specifically, the computing device can extract information such as the layout of the objects including the building and the distribution of the terrain based on at least one of the two-dimensional map information and the three-dimensional map information. The extracted information can be extracted through analysis of three-dimensional map information, and characteristics related to transmission of a subsequent signal can be analyzed based on such information. Such information can include shape information of buildings, structures, and plants on the surface or surface of the water.

At step 1410, the computing device may perform a pre-processing step for ray tracing simulation. In an embodiment, the pre-processing step may include acquiring real environment information based on at least one of map information or image information. The real environment information may include objects placed on a communication path and characteristics of the objects. The characteristics of the objects may include at least one of foliage that may appear on a 3-dimension map or surface material and a facade of an object placed in the 3-dimensional map. In an embodiment, the facade of the object may include the exterior appearance of the object. In an embodiment, it may be possible to determine a candidate location where a transmitter is located in the modeled map. The candidate location of the transmitter may be determined based on at least one of previously-deployed base station information, building information, road information, or user distribution. In an embodiment, it may be possible to minimize the number of candidate transmitter locations based on the map-related 2-dimensional image information.

In an embodiment, the computing device may analyze the 2-dimensional image information to identify the characteristics of an object that may be placed on the communication path. The characteristics of the object may include at least one of a surface material or appearance of the object and, in the case of an object allowing penetration of a radio wave, even information on the shape and signal attenuation degree when the radio wave penetrates the object.

The information obtained in the preprocessing step may be mapped to the modeled map obtained in the step 1405. At least one of surface material and external material information corresponding to the more specifically identified building layout may be mapped to the building layout.

At step 1415, the computing device may perform a ray tracing simulation based on the information acquired at steps 1405 and 1410. In an embodiment, the ray tracing simulation may be performed in such a way of changing beam information in consideration of the corresponding beam direction or under the assumption that the transmitter forms a beam in all the directions that it can transmit in the same time period. In more detail, in an embodiment, it may be possible to perform the ray tracing simulation under the assumption that omnidirectional beams are transmitted from all of the candidate transmitter locations. It may be possible to predict signal qualities at a receiver based on the propagation paths of the signal from the transmitter to the receiver, as a result of the ray tracing simulation, and analyze the predicted signal qualities. In an embodiment, the ray tracing simulation may be performed in such a way of determining at least one of transmitter locations or receiver locations based on the 3-dimensional map information and identify the signal transmission environment based on the information mapped at step 1410. In an embodiment, the omnidirectional beams may include transmitting signals under the assumption that individual transmitters form the omnidirectional beams for transmitting the signals in their available directions. All candidate transmitters may include all candidate transmitter locations that are considered in performing the ray tracing simulation.

It may also be possible to use foliage information and an object's material and facade information extracted at step 1430 for the ray tracing. In detail, it may be possible to perform the ray tracing using the information on the location, type, height, and width of the foliage. The object's material and facade information may include at least one of a reflection coefficient, a diffraction coefficient, or a scattering coefficient.

At step 1420, the computing device may perform a post-processing (post channel processing) based on the ray tracing result. In detail, the computing device may perform additional arithmetic operations in consideration of mmWave beamforming elements, beam azimuths, and beam tilts obtained based on a result of the ray tracing simulation performed at step 1415 under the assumption of omnidirectional beamforming at all candidate transmitters and in consideration of previous transmitter sites. In more detail, an additional result value may be obtained by applying changed consideration elements to the result value obtained at step 1415. In an embodiment, the post-processing procedure may be selectively performed.

As described above, it may be possible to perform the post channel simulation based on the ray information acquired through the ray tracing simulation. In the post channel simulation, it may be possible to analyze the throughput of the communication system by reflecting system configuration based on ray-specific information, links between the transmitter and receiver, and all system level consideration elements. Because the analysis may be performed after selecting the beams (azimuths/tilts) of the transmitter and individual receivers and the link/system configuration and base station/beam selection procedures may be organizationally associated with each other, the post channel simulation may include all of the base station selection procedure, azimuth/tilt adjustment and post channel simulation procedure, and result data analysis procedure, in the broad sense.

In an embodiment, the post channel simulation may include operations as follows. The post channel simulation may include applying an antenna pattern, applying an outdoor-to-indoor loss, applying various gains according to Tx and Rx implementation configurations, reflecting interference from other base stations, performing link adaptation, and selecting the best transmitter combination and beam directions of the transmitter and receivers through result analysis. If it is difficult to reflect signal attenuation caused by foliage in the ray tracing-front end, foliage modeling and reflection may also be performed in the post channel simulation.

An example of a criterion for selecting a transmitter and a beam in a post channel simulation step may include selecting a transmitter and a beam to enable service to a terminal having a certain ratio or more based on the minimum number of transmitters, can be determined. Also, first, a beam is formed in all directions for all transmitter candidate regions, and a base station and a beam having the largest number of receivers to achieve a specific power or data rate or higher are selected through the beam. Likewise, for the remaining base station candidates and receivers, the most serviced receiver sequentially selects many transmitters and beams, and stops adding transmitters if the served receiver achieves a reference outage within the considered service area. This process is only one example of the process of selecting the base station and the beam, and the criteria for evaluating the performance of the actual system can be considered variously.

It may be possible to consider outdoor-to-indoor (O2I) and rain loss in performing the post-processing step such as step 1435. If a transmitter is located outside a building and a receiver is located inside the building, an O2I loss may occur in transmitting the signal. In a situation where the signal passes through a window, such a loss may be called window penetration loss. By reflecting such information to the post-processing, it is possible to determine the best transmitter location. By considering such window penetration loss, it may be possible to acquire information on a ray that arrives at a window based on a ray tracing result performed based on the 3-dimensional map mode in the case where the transmitter is located inside the building and the receiver is located outside the building and information on the signal finally arriving at the receiver located indoor based on the acquired ray information. Although the description is directed to the case where the ray passes through a window, it is obvious that the technical feature of the disclosure is applicable to any case where a signal transmitted from outside of a building or a structure penetrates a certain obstacle.

At step 1425, the computing device may analyze radio communication links and a total transmission throughput of the communication system based on the result of the post-processing step. The computing device may also perform an additional ray tracing simulation by reflecting a real measurement result and an additional pre-processing step based on the additional ray tracing simulation result.

In an embodiment, it may also be possible to perform a real measurement in an environment corresponding to the information acquired at step 1140, perform pre-processing based on the information acquired through the measurement, and perform at least one of the ray tracing simulation or the post-processing step again. Like this, it may be possible to perform a simulation with the input of various parameter values of the real environment elements for network planning. If the real environment elements change after the initial network panning, it may be possible to perform calibration on the previous result with the input of changed parameters.

In an embodiment, it may be possible to perform a ray tracing simulation based on the parameters affecting a signal transmission that are extracted from the real environment. In a wireless communication system employing a beamforming technique for effective mmWave signal transmission, it may be possible to perform a ray tracing simulation for all possible cases considering all steps from the ray tracing step to the step of forming beams between an individual transmitter to receivers for network planning. However, in the case of performing ray tracings for all beamforming cases as above, the number of ray tracing simulations may increase. Such ray tracing simulations demand tracing propagation paths of all rays, which requires a long simulation time. In an embodiment, it may also be possible to perform a ray tracing simulation using an isotropic antenna pattern with which a regular power emits in all directions without considering any beamforming of at least one of the transmitter or the receiver. On the basis of this information, it may be possible to search for a best beam pattern in consideration of the system configuration and beamform value in the post-channel simulation stage and furthermore acquire an appropriate base station location a beam pattern. As a consequence, the ray tracing simulation is performed just once with the isotropic antenna pattern. However, if the best base station and beam combination selected through the post-processing procedure does not meet the system requirements, it may be possible to select new candidate base stations and perform the ray tracing simulation again with the newly selected candidate base stations. The ray tracing simulation is performed with the inclusion of all of reflection, diffraction, scattering, and penetration paths. As parameters corresponding to the objects on the respective ray propagation paths, variables mapped to the real environment elements are used for precise simulation. It may also be possible to reflect an influence of signal attenuation caused by an obstacle including foliage in the simulation. Such additional information may be acquired through image information analysis and mapped to the 3-dimensional map model on the basis of which the ray tracing simulation is performed.

Through the channel environment analysis as above, it is possible to dramatically reduce the time required for simulation. In the case of using a simulation technique considering individual beams formed per transmitter, simulation should be performed for the respective beams, which increases the number of simulations in proportion to the number of base stations and the number of beams. However, as described above, it may be possible to reduce the time required for simulation by performing omnidirectional beam-based ray tracing simulation and acquiring beam-related information through the post-processing procedure.

Figure 15:
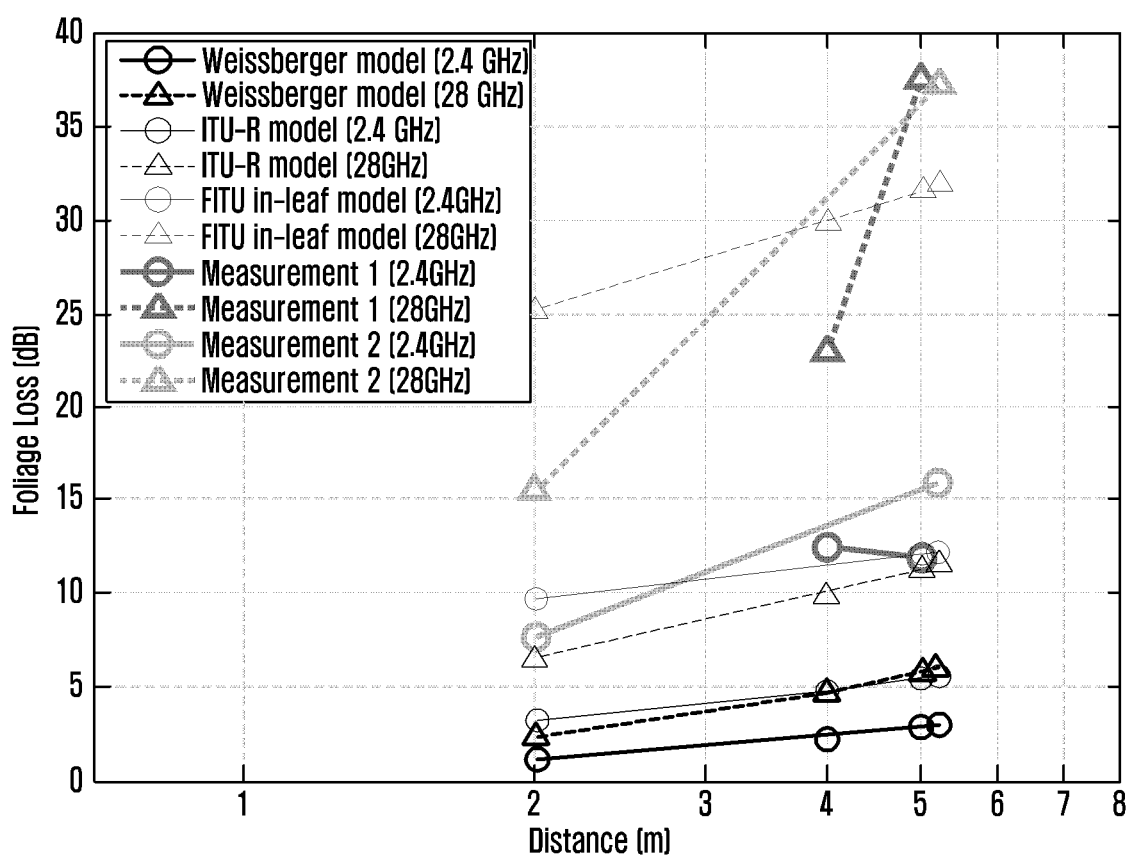
FIG. 15 is a diagram illustrating a signal attenuation degree varying with foliage characteristics according to an embodiment of the disclosure.

FIG. 15 is a diagram illustrating a signal attenuation degree varying with foliage characteristics according to an embodiment of the disclosure.

FIG. 15 depicts foliage loss that varies according to distance in different environments. The mmWave radio wave in use for 5G communication has strong straightness and is sensitive to obstacles, which requires a method for analyzing a signal propagation environment more accurately. For example, it is observed that the signal attenuation affected by foliage is more significant and harder to predict in an mmWave than in a legacy frequency band. Diffraction makes it difficult for a signal to arrive at the back of an obstacle, and an effect caused by reflection varies according to the material of a reflective surface. In order to predict the propagation path of the mmWave accurately, it is positively necessary to extract the real environment accurately as proposed in the disclosure.

Figure 16:
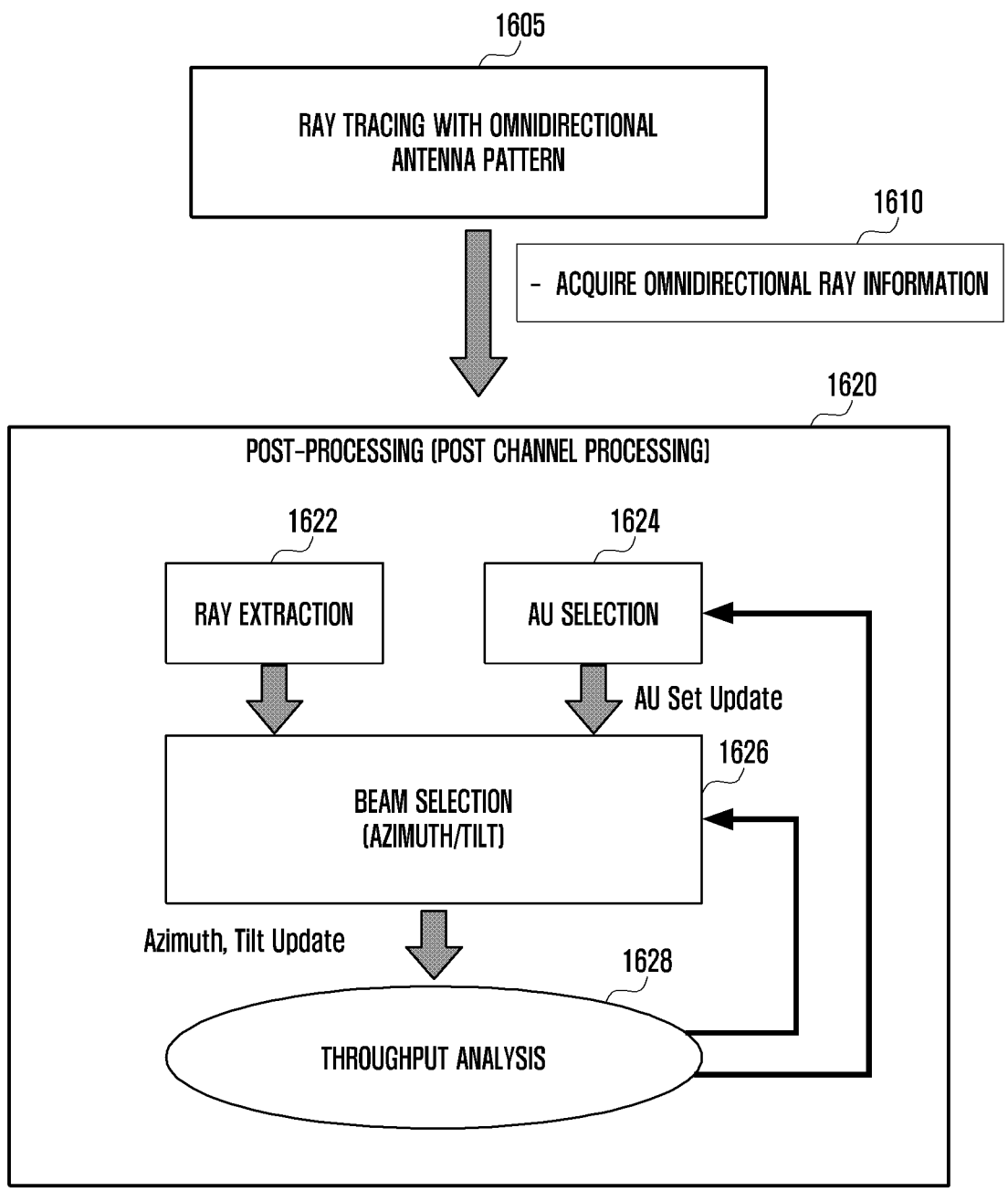
FIG. 16 is a diagram for explaining a method for performing post-processing based on a ray tracing result for a communication environment analysis according to an embodiment of the disclosure.

FIG. 16 is a diagram for explaining a method for performing a post-processing (post channel processing) based on a ray tracing result for communication environment analysis according to an embodiment of the disclosure.

In reference to FIG. 16, a computing device may perform the post-processing based on a ray tracing simulation result.

In detail, the computing device at step 1605 may perform the ray tracing simulation based on an isotropic antenna pattern. The isotropic antenna pattern-based ray tracing simulation makes it possible, at step 1610, to acquire information on a ray that is not beamformed in a specific direction.

At step 1620, the computing device may perform the post-processing based on a simulation result value obtained as above.

At step 1622, the computing device may extract a ray to be considered in performing the post-processing based on the simulation result. In detail, the computing device may extract a ray with a power equal to or greater than a predetermined power among the acquired rays. Afterward, the computing device may form a beam for each of the rays selected through the post-processing operation and compare the rays or transmitter capabilities to select the best transmitter combination and beam combination. A specific power may correspond to a predetermined value and may be determined according to the ambient environment or channel condition.

At step 1624, the computing device may select transmitters based on the simulation result. In detail, the computing device may select a combination of transmitters that makes it possible to provide receivers equal in number to or greater than a predetermined number with a service. The above-described transmitter selection method may include the methods described in the previous embodiments.

At step 1626, the computing device may select beam information based on the selected base station and ray information. In detail, the computing device may select an azimuth and tilt for a beam to be formed by the selected base station. The computing device may perform an arithmetic operation on the result of the beamforming for the corresponding ray based on the previous simulation result.

At step 1628, the computing device may analyze the total system throughput based on the beamforming information to be applied for the ray of the selected transmitter. The computing device may perform the previous steps again depending on whether the throughput satisfies a predetermined threshold. In detail, the computing device may perform at least one of steps 1622, 1624, and 1626 depending on whether the throughput satisfies the predetermined threshold.

The information on the propagation paths of rays transmitted by individual transmitters may be obtained based on the ray tracing simulation. Analyzing the cases of applying beamforming to the respective rays based on the ray tracing simulation result makes it possible to acquire a simulation result close to that achievable in the real signal transmission environment. It may also be possible to acquire a more reliable result by applying the real environment information described throughout the disclosure to at least one of the ray tracing simulation or the post-processing.

It may be possible to automate the whole simulation procedure for network planning by using the embodiments of the disclosure. In detail, it may be possible to execute all of the 3-dimensional map model acquisition, image analysis, ray tracing simulation, and post-processing on the basis of basic data without user intervention.

According to an embodiment, it may also be possible to acquire modification information for network management by inputting changed parameters to the computing device even after the network planning has been completed.

Figure 17:
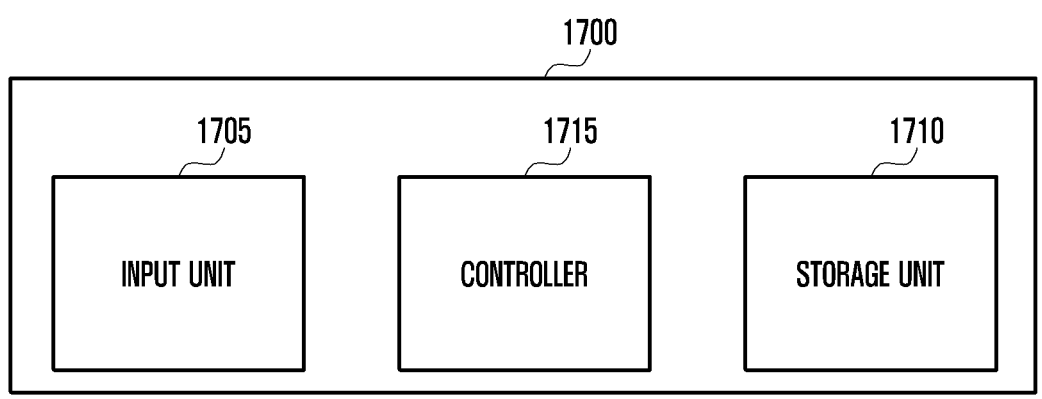
FIG. 17 is a block diagram illustrating a computing device for a simulation according to an embodiment of the disclosure.

FIG. 17 is a block diagram illustrating a computing device for a simulation according to an embodiment of the disclosure.

FIG. 17 shows the computing device according to an embodiment of the disclosure.

In reference to FIG. 17, the computing device 1700 according to this embodiment includes a transceiver 1702, a storage unit 1704, and a controller 1706.

The transceiver 1702 may transmit and receive signals to and from an external device. In detail, the transceiver may transmit and receive data to and from the external device and has an interface for data communication.

The storage unit 1704 may store at least one of information on the computing device 1700 or information being transmitted and received by the transceiver 1702. The storage unit may also store all information necessary for the simulation according to an embodiment of the disclosure such as simulation result information, information on a surface material and appearance of an object based on an image analysis, 3-dimensional map information, and information on a surface material and appearance of an object mapped to the 3-dimensional map information. The information on at least one of a simulation result or a comparison result may be added, deleted, and updated in the storage unit 1704.

The controller 1706 may control an operation of the computing device 1700 and all of the computing device to perform the operations related to the operations described in the above embodiments. The controller 1706 may include at least one processor. The processor may be controlled by a program comprised of instructions for executing the method described in an embodiment of the disclosure. The program may be stored in a storage medium, which may be a volatile or non-volatile memory. The memory may be a medium capable of storing data and may not be limited in type if it can store the aforementioned instructions.

Although the embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

The invention claimed is:

1. A method for analyzing a signal transmission characteristic in a wireless communication system, the method comprising:
   acquiring first information including at least one of 2-dimensional image information or 3-dimensional map information;
   acquiring second information including real environment information based on the first information;
   determining at least a plurality of candidate transmitter locations based on at least one of the first information or the second information;
   performing a ray tracing simulation based on the first information, second information, and the plurality of candidate transmitter locations; and
   determining the signal transmission characteristic based on a result of the ray tracing simulation,
   wherein the real environment information includes at least one of material information or appearance information of an object or radio wave propagation information through the object, and
   wherein the determining of the plurality of candidate transmitter locations comprises:
   determining locations where a transmitter can be installed based on the image information,
   determining radio wave propagation distances of a transmitter corresponding to the locations where the transmitter can be installed,
   determining a priority by the locations where the transmitter can be installed, and
   determining the plurality of candidate transmitter locations based on the locations where the transmitter can be installed, the radio wave propagation distances of the transmitter and the priority.

2. The method of claim 1, further comprising:
   determining at least one transmitter location among the plurality of candidate transmitter locations based on the result of the ray tracing simulation;
   acquiring information related to at least one ray transmitted by a transmitter corresponding to the at least one determined transmitter location; and
   selecting a ray with a power equal to or greater than a predetermined power among the at least one ray.

3. The method of claim 2, further comprising:
   determining beamforming information including at least one of an azimuth or a tilt for a beam to be formed by the transmitter based on the one transmitter location and the ray; and
   determining the signal transmission characteristic based on the beamforming information, wherein the beamforming information is applied for the ray of the transmitter.

4. The method of claim 1, wherein the signal transmission characteristic is further determined based on a radio wave penetration loss.

5. The method of claim 1, wherein performing the ray tracing simulation comprises performing the ray tracing simulation in consideration of using an antenna pattern having a physical property identical in all directions at the plurality of candidate transmitter locations.

6. A non-transitory storage medium, the storage medium storing a program comprising instructions for executing the method of claim 1.

7. A computing device for analyzing a signal transmission characteristic in a wireless communication system, the device comprising:
   a transceiver configured to transmit and receive information; and
   a controller configured to control to acquire first information including at least one of 2-dimensional image information or 3-dimensional map information, acquire second information including real environment information based on the first information, determine a plurality of candidate transmitter locations based on at least one of the first information or the second information, and perform a ray tracing simulation based on the first information, second information, and the plurality of candidate transmitter locations, and determine the signal transmission characteristic based on a result of the ray tracing simulation,
   wherein the real environment information includes at least one of material information of an object or radio wave propagation information through the object, and
   wherein the controller is further configured to control to:
   determine locations where a transmitter can be installed based on the image information,
   determine radio wave propagation distances of a transmitter corresponding to the locations where the transmitter can be installed,
   determine a priority by the locations where the transmitter can be installed, and
   determine the plurality of candidate transmitter locations based on the locations where the transmitter can be installed, the radio wave propagation distances of the transmitter and the priority.

8. The device of claim 7, wherein the controller is further configured to control to:
- determine one transmitter location among the plurality of candidate transmitter locations based on the result of the ray tracing simulation,
- acquire information related to at least one ray transmitted by a transmitter corresponding to the determined transmitter location, and
- select a ray with a power equal to or greater than a predetermined power among the at least one ray.

9. The device of claim 8,
- wherein the controller is further configured to control to:
- determine beamforming information including at least one of an azimuth or a tilt fora beam to be formed by the transmitter based on the one transmitter location and the ray, and
- determine the signal transmission characteristic based on the beamforming information, and
- wherein the beamforming information is applied for the ray of the transmitter.

10. The device of claim 7, wherein the signal transmission characteristic is further determined based on a radio wave penetration loss.

11. The device of claim 7, wherein the controller is further configured to control to perform the ray tracing simulation in consideration of using an antenna pattern having a physical property identical in all directions at the plurality of candidate transmitter locations.

12. A method for designing a network of a wireless communication system, the method comprising:
- acquiring real environment information based on 3-dimensional map information and image information related to the 3-dimensional map information;
- determining a plurality of candidate transmitter locations based on the real environment information;
- performing a ray tracing simulation based on the real environment information and the plurality of candidate transmitter locations;
- determining a signal transmission characteristic based on a result of the ray tracing simulation;
- selecting one transmitter location among the plurality of candidate transmitter locations based on the result of the ray tracing simulation; and
- determining a ray satisfying a predetermined criterion among at least one ray transmitted by a transmitter corresponding to the selected transmitter location,
- wherein the real environment information includes at least one of material information of an object or radio wave propagation information through the object, and
- wherein the determining of the plurality of candidate transmitter locations comprises:
- determining locations appropriate for transmitter installation based on the image information,
- determining radio wave propagation distances of a transmitter corresponding to the locations appropriate for transmitter installation,
- determining a priority by the locations appropriate for transmitter installation, and
- determining the plurality of candidate transmitter locations based on the locations appropriate for transmitter installation, the radio wave propagation distances of the transmitter, and the priority.

* * * * *